United States Patent [19]
Tokunaga et al.

[11] Patent Number: 5,610,960
[45] Date of Patent: Mar. 11, 1997

[54] FUEL SPACER AND FUEL ASSEMBLY

[75] Inventors: Kensuke Tokunaga, Takahagi; Yasuhiro Aizawa, Hitachi; Junjiro Nakajima, Hitachi; Masana Sasaki, Hitachi; Masayoshi Ajima, Hitachi; Masafumi Imai, Hitachiohta, all of Japan

[73] Assignee: Hitachi, Ltd., Tokyo, Japan

[21] Appl. No.: 519,099

[22] Filed: Aug. 24, 1995

[30] Foreign Application Priority Data

Aug. 25, 1994 [JP] Japan .................................. 6-200904

[51] Int. Cl.[6] .................................................. G21C 3/34
[52] U.S. Cl. ........................ 376/441; 376/442; 376/438; 376/459; 376/448; 376/434; 376/260; 376/439
[58] Field of Search .................................. 376/441, 442, 376/438, 459, 448, 434, 260, 439; 976/DIG. 73, DIG. 80

[56] References Cited

U.S. PATENT DOCUMENTS

| | | | |
|---|---|---|---|
| 3,904,475 | 9/1975 | Tashima | 376/441 |
| 4,508,679 | 4/1985 | Matzner et al. | 376/438 |
| 4,587,704 | 5/1986 | Matzner et al. | 29/446 |
| 5,069,864 | 12/1991 | Johansson | 376/441 |
| 5,078,961 | 1/1992 | Johansson | 376/448 |
| 5,313,506 | 5/1994 | Matzner et al. | 376/441 |
| 5,490,192 | 2/1996 | Nakajima et al. | 376/441 |

*Primary Examiner*—Charles T. Jordan
*Assistant Examiner*—Meena Chelliah
*Attorney, Agent, or Firm*—Antonelli, Terry, Stout & Kraus, LLP

[57] ABSTRACT

With an arrangement that the axial distance from the upper end of a first opening area to the upper end of the second opening area is equal to the axial distance from the upper end of a first coupling member to the upper end of a second coupling member, when a spring member is moved upwardly relative to round cells, the upper end of the second coupling member comes into contact with the upper end of the second opening area, and the spring members receives upwardly acting forces from fuel elements. The spring member is thereby prevented from inclining with respect to flow of a coolant. Simultaneously, the upper end of the first coupling member contacts the upper end of the first opening area, and the spring member is stably held in a condition where it is aligned with the direction of the coolant flow. Also, since the axial distance from the lower end of the first opening area to the lower end of the second opening area is smaller than the axial distance from the lower end of the first coupling member to the lower end of the second coupling member, the lower end of the first coupling member does not come into contact with the lower end of the first opening area when the fuel element is inserted. Thus, the friction force produced during passage of the fuel member along the spring member is small and the fuel element can be inserted more easily.

23 Claims, 18 Drawing Sheets

FUEL SPACER AND FUEL ASSEMBLY

BACKGROUND OF THE INVENTION

The present invention relates to a fuel assembly, and more particularly to a fuel spacer of round cell type suitable for boiling water reactors, and a fuel assembly employing the fuel spacer.

Generally, a fuel assembly for use in boiling water reactors comprises a plurality of fuel elements and a water rods. These fuel elements and water rods are bundled by a plurality of fuel spacers into a square grid pattern with a certain spacing left between adjacent twos. Also, these fuel elements and water rods are held by an upper tie plate and an a lower tie plate at respective ends to make up a fuel bundle which is housed in a channel box.

One example of such fuel spacers is a fuel spacer of round cell type that fuel elements are supported by being inserted to a plurality of cylindrical members (round cells). The fuel spacer of round cell type is constructed by arranging round cells in a grid pattern in a mutually contacting relation, and joining the adjacent round cells together by welding. A fuel element inserted to each of the round cells is radially supported by two projections formed by projecting parts of the round cell inwardly, and springs. The springs are provided in such a manner as to penetrate upper and lower openings formed in two round cells in a position where the two round cells contact each other, and to project into both the round cells.

The following prior arts, for example, are known as being related to fuel spacers of round cell type.

(1) JP, A, 59-65287
(2) JP, B, 3-76879

In fuel spacers described in these prior arts (1) and (2), a loop-like spring comprising a pair of opposed leaf springs and arcuate coupling members for coupling the leaf springs at their upper and lower ends is assembled in a round cell.

(3) JP, A, 5-150072

In a fuel spacer described in this prior art (3), a pair of opposed leaf springs are coupled to each other at their upper and lower ends by a flat semi-annular coupling members.

(4) JP, A, 2-221891

In a fuel spacer described in this prior art (4), coupling members for coupling a pair of opposed leaf springs at their upper and lower ends are provided with upper and lower ears which are respectively embraced by upper and lower embracing portions provided on an outer peripheral surface of a round cell.

SUMMARY OF THE INVENTION

Fuel spacers serve to not only hold fuel elements and water rods in a fuel assembly while keeping a certain horizontal spacing therebetween, but also bind the fuel elements and the water rods so that they will not vibrate horizontally. For fulfilling those functions, fuel spacers are required to have sufficient strength. In addition, from the viewpoint of thermo-hydrodynamic characteristics of fuel, it is desired that fuel spacers have resistance against flow of a coolant (usually called pressure loss of a coolant in fuel spacers) as small as possible.

Viewing from the point of reducing the pressure loss, the foregoing prior arts (1) to (4) have problems below.

In the prior arts (1) and (2), the coupling members positioned at the opposite ends of the loop-like spring are structured to block the pathway of a coolant flowing through the fuel assembly. More specifically, the coolant flowing into the loop-like spring is first decelerated by impinging against the lower coupling member, then changes the direction of flow to be divided into two streams along outer surfaces of the pair of opposed leaf springs, and thereafter is accelerated while passing narrow gaps between the leaf springs and the fuel element(s) or the water rods. Such a process of deceleration, acceleration and turbulence of the coolant flow due to the pathway being blocked by the coupling member acts to increase the pressure loss and, hence, impede the purpose of reducing the pressure loss.

In the prior art (3), the coupling members coupling the leaf springs at their upper and lower ends are shaped to be open to the coolant flow for reducing the pressure loss. No considerations are, however, paid to the pressure loss caused by the fact that the spring is inclined with respect to the direction of the coolant flow and an area of the coolant pathway is reduced. In other words, if the spring is inclined, a projected area of the spring itself relative to the direction of the coolant flow is increased to enlarge resistance against the coolant flow, resulting in a problem of increasing the pressure loss.

In the prior art (4), the upper and lower embracing portions in the form of grooves extending in the flow direction hold the upper and lower ears of the coupling members so as to suppress inclination of the spring. But the spring may incline within the range of clearance between the embracing portions and the ears. If the clearance is too small, the efficiency of assembly and manufacture would be lowered and, hence, the clearance cannot be made so small. As a result, it has been impossible to sufficiently prevent the inclination of the spring. Further, since the ears newly provided on the spring are projected laterally to a large extent with respect to the flow direction, the ears themselves give rise to resistance against the coolant flow, thereby increasing the pressure loss.

Meanwhile, in a step of inserting fuel elements as one of assembly steps for a fuel assembly, because the fuel elements are inserted from above, springs contacting the fuel elements are generally pushed by the force applied to insert the fuel elements and moved downwardly in the axial direction. On this occasion, in the arrangements of the prior arts (1) to (4), at the same time as when the lower end of the upper coupling member comes into contact with the lower end of an upper opening, the lower end of the lower coupling member comes into contact with the lower end of a lower opening. This impedes an improvement in the efficiency of assembly because the spring will not smoothly move and the friction force produced upon the fuel element passing through the fuel spacer is increased, making it difficult to insert the fuel element.

An object of the present invention is to provide a fuel spacer which can surely prevent inclination of a spring, can sufficiently reduce pressure loss of a coolant, and can improve the assembly efficiency of a fuel assembly, as well as a fuel assembly employing the fuel spacer.

To achieve the above object, according to the present invention, there is provided a fuel spacer comprising a plurality of cylindrical members to which fuel elements are respectively inserted, and a plurality of loop-like spring members held by the cylindrical members for resiliently supporting the fuel elements positioned in the respective pairs of adjacent cylindrical members, the plurality of cylindrical members each including a spring support portion inserted to the loop-like spring member for supporting the loop-like spring member and first and second opening areas formed respectively above and below the spring support portion, the plurality of loop-like spring members each comprising a pair of leaf spring portions and first and second coupling portions for coupling the pair of leaf spring portions at two upper and lower points, wherein the distance from the upper end of the first opening area to the upper end of the second opening area in the axial direction of the fuel elements is substantially equal to the distance from the upper end of the first coupling portion to the upper end of the second coupling portion in the axial direction of the fuel elements, and the distance from the lower end of the first opening area to the lower end of the second opening area in the axial direction of the fuel elements has a different value from the distance from the lower end of the first coupling portion to the lower end of the second coupling portion in the axial direction of the fuel elements.

Preferably, the first and second coupling portions are each structured to define therein a coolant pathway for introducing a coolant in the axial direction of the fuel elements.

Generally, in a fuel assembly of reactors under operation, fuel elements and water rods tend to extend in the axial direction due to thermal expansion and other causes. Thus, the fuel elements and the water rods extend upwardly with the position of a lower tie plate supporting them as a reference. At this time, since a plurality of loop-like spring members each resiliently support a pair of fuel elements inserted to adjacent cylindrical members (round cells) in a fuel spacer, the loop-like spring members are also moved upwardly in the axial direction of the fuel elements following axially upward expansion of the fuel elements. On the other hand, the plurality of cylindrical members are usually supported by the water rod in the axial direction through support members provided on the water rod, and are also moved upwardly in the axial direction of the fuel elements following axially upward expansion of the water rod. Then, since the fuel elements as heat radiating bodies expand in a larger amount than the water rods as an a heat non-radiating body, the amount by which the loop-like spring members are moved is larger than the amount by which the cylindrical members are moved. Accordingly, the loop-like spring members are moved relatively upwardly with respect to the cylindrical members.

Now, in the present invention, the axial distance from the upper end of the first opening area of the cylindrical member to the upper end of the second opening area is substantially equal to the axial distance from the upper end of the first coupling portion of the loop-like spring member to the upper end of the second coupling portion. Therefore, when the loop-like spring member is moved relatively upwardly with respect to the cylindrical members, the upper end of the second coupling portion of the loop-like spring member first comes into contact with the upper end of the second opening area of each cylindrical member and, in this condition, the loop-like spring member is then subjected to forces imposed from the left and right fuel elements to act upwardly. Accordingly, even if the direction of central axis of the loop-like spring member (i.e., of an axis connecting the centers of the first and second coupling portions) is initially inclined out of alignment with the direction of the coolant flow, the direction of central axis of the loop-like spring member is corrected by the action of the forces imposed after the contact between the loop-like spring member and the fuel elements. As a result, the direction of central axis of the loop-like spring member is aligned with the direction of the coolant flow and, thereafter, the loop-like spring member will not incline relative to the coolant flow. At this time, since the upper end of the first coupling portion of the loop-like spring member simultaneously contacts the upper end of the first opening area of each cylindrical member, the loop-like spring member is held in the condition where the direction of central axis of the loop-like spring member is aligned with the direction of the coolant flow and then stably maintained in the aligned condition. As a result, the loop-like spring member is surely prevented from inclining with respect to the direction of the coolant flow, thereby ensuring smooth flow of the coolant, and pressure loss of the coolant can be reduced sufficiently. Further, the first and second coupling portions provided on each of the loop-like spring members preferably each define therein the coolant pathway for introducing the coolant in the axial direction of the fuel elements, resulting in that the pressure loss can effectively be reduced.

Generally, in a step of inserting fuel elements as one of assembly steps for a fuel assembly, because the fuel elements are inserted from above, the loop-like spring members contacting the fuel elements are pushed by the force applied to insert the fuel elements and moved downwardly in the axial direction. At this time, in the present invention, because the axial distance from the lower end of the first opening area to the lower end of the second opening area is different from the axial distance from the lower end of the first coupling member to the lower end of the second coupling member, the loop-like spring member is prevented from becoming jammed in its movement unlike the prior art in which the two distances are equal to each other. More specifically, in the case of the axial distance from the lower end of the first opening area to the lower end of the second opening area being smaller than the axial distance from the lower end of the first coupling portion to the lower end of the second coupling portion, when the fuel element is inserted, the lower end of the second coupling portion comes into contact with the lower end of the second opening area, but the lower end of the first coupling portion does not come into contact with the lower end of the first opening area. Accordingly, the upper end portion of the loop-like spring member can freely be moved to ensure a space necessary for the initial stage of insertion of the fuel element, and the friction force produced during passage of the fuel element along the loop-like spring member is reduced and, hence, the fuel element can be inserted more easily. In the alternative case of the axial distance from the lower end of the first opening area to the lower end of the second opening area being larger than the axial distance from the lower end of the first coupling portion to the lower end of the second coupling portion, when the fuel element is inserted, the lower end of the first coupling portion comes into contact with the lower end of the first opening area, but the lower end of the second coupling portion does not come into contact with the lower end of the second opening area. Accordingly, the lower end portion of the loop-like spring member can freely be moved and the friction force produced during passage of the fuel element along the loop-like spring member is reduced and, hence, the fuel element can be inserted more easily. Thus, in any case, the efficiency of assembling the fuel assembly can be improved.

In the above fuel spacer, preferably, the difference between the distance from the upper end of the first opening area to the upper end of the second opening area in the axial direction of the fuel elements and the distance from the upper end of the first coupling portion to the upper end of the second coupling portion in the axial direction of the fuel elements is not larger than 2% of the total axial length of the loop-like spring member.

With such arrangements, the two distances can be made substantially equal to each other even in anticipation of manufacture tolerance of 1% for each of the cylindrical member and the loop-like spring member.

In the above fuel spacer, preferably, the distance from the lower end of the first opening area to the lower end of the second opening area in the axial direction of the fuel elements is smaller than the distance from the lower end of the first coupling portion to the lower end of the second coupling portion in the axial direction of the fuel elements.

In the above fuel spacer, preferably, the distance from the lower end of the first opening area to the lower end of the second opening area in the axial direction of the fuel elements is larger than the distance from the lower end of the first coupling portion to the lower end of the second coupling portion in the axial direction of the fuel elements.

In the above fuel spacer, preferably, the difference between the distance from the lower end of the first opening area to the lower end of the second opening area in the axial direction of the fuel elements and the distance from the lower end of the first coupling portion to the lower end of the second coupling portion in the axial direction of the fuel elements is larger than 2% of the total axial length of the loop-like spring member.

With such arrangements, the two distances can be made different from each other even in anticipation of manufacture tolerance of 1% for each of the cylindrical member and the loop-like spring member.

In the above fuel spacer, preferably, the length from the upper end to the lower end of the first coupling portion in the axial direction of the fuel elements is equal to the length from the upper end to the lower end of the second coupling portion in the axial direction of the fuel elements, and the length from the upper end to the lower end of the first opening area in the axial direction of the fuel elements is larger than the length from the upper end to the lower end of the second opening area in the axial direction of the fuel elements.

With such arrangements, eventually, the axial distance from the lower end of the first opening area to the lower end of the second opening area becomes smaller than the axial distance from the lower end of the first coupling portion to the lower end of the second coupling portion. It is thus possible that when the fuel element is inserted, the lower end of the second coupling portion comes into contact with the lower end of the second opening area, but the lower end of the first coupling portion does not come into contact with the lower end of the first opening area.

In the above fuel spacer, preferably, the length from the upper end to the lower end of the first coupling portion in the axial direction of the fuel elements is equal to the length from the upper end to the lower end of the second coupling portion in the axial direction of the fuel elements, and the length from the upper end to the lower end of the first opening area in the axial direction of the fuel elements is smaller than the length from the upper end to the lower end of the second opening area in the axial direction of the fuel elements.

With such arrangements, eventually, the axial distance from the lower end of the first opening area to the lower end of the second opening area becomes larger than the axial distance from the lower end of the first coupling portion to the lower end of the second coupling portion. It is thus possible that when the fuel element is inserted, the lower end of the first coupling portion only comes into contact with the lower end of the first opening area, but the lower end of the second coupling portion does not come into contact with the lower end of the second opening area.

In the above fuel spacer, preferably, the length from the upper end to the lower end of the first opening area in the axial direction of the fuel elements is equal to the length from the upper end to the lower end of the second opening area in the axial direction of the fuel elements, and the length from the upper end to the lower end of the first coupling portion in the axial direction of the fuel elements is smaller than the length from the upper end to the lower end of the second coupling portion in the axial direction of the fuel elements.

With such arrangements, eventually, the axial distance from the lower end of the first opening area to the lower end of the second opening area becomes smaller than the axial distance from the lower end of the first coupling portion to the lower end of the second coupling portion. It is thus possible that when the fuel element is inserted, the lower end of the second coupling portion comes into contact with the lower end of the second opening area, but the lower end of the first coupling portion does not come into contact with the lower end of the first opening area.

In the above fuel spacer, preferably, the length from the upper end to the lower end of the first opening area in the axial direction of the fuel elements is equal to the length from the upper end to the lower end of the second opening area in the axial direction of the fuel elements, and the length from the upper end to the lower end of the first coupling portion in the axial direction of the fuel elements is larger than the length from the upper end to the lower end of the second coupling portion in the axial direction of the fuel elements.

With such arrangements, eventually, the axial distance from the lower end of the first opening area to the lower end of the second opening area becomes larger than the axial distance from the lower end of the first coupling portion to the lower end of the second coupling portion. It is thus possible that when the fuel element is inserted, the lower end of the first coupling portion comes into contact with the lower end of the first opening area, but the lower end of the second coupling portion does not come into contact with the lower end of the second opening area.

In the above fuel spacer, preferably, the length from the upper end to the lower end of the first coupling portion in the axial direction of the fuel elements is equal to the length from the upper end to the lower end of the second coupling portion in the axial direction of the fuel elements, and the length from the upper end of the first opening area to the upper end of the second opening area in the axial direction of the fuel elements is larger than the length from the lower end of the first opening area to the lower end of the second opening area in the axial direction of the fuel elements.

With such arrangements, the axial length from the upper end to the lower end of the first opening area becomes larger than the axial length from the upper end to the lower end of the second opening area, and the axial length from the upper end to the lower end of the first coupling portion is equal to the axial length from the upper end to the lower end of the second coupling portion. Eventually, as mentioned above, the axial distance from the lower end of the first opening area to the lower end of the second opening area becomes smaller than the axial distance from the lower end of the first coupling portion to the lower end of the second coupling portion. It is thus possible that when the fuel element is inserted, the lower end of the second coupling portion comes into contact with the lower end of the second opening area, but the lower end of the first coupling portion does not come into contact with the lower end of the first opening area.

In the above fuel spacer, preferably, the length from the upper end to the lower end of the first coupling portion in the axial direction of the fuel elements is equal to the length from the upper end to the lower end of the second coupling portion in the axial direction of the fuel elements, and the length from the upper end of the first opening area to the upper end of the second opening area in the axial direction of the fuel elements is smaller than the length from the lower end of the first opening area to the lower end of the second opening area in the axial direction of the fuel elements.

With such arrangements, the axial length from the upper end to the lower end of the first opening area becomes smaller than the axial length from the upper end to the lower end of the second opening area, and the axial length from the upper end to the lower end of the first coupling portion is equal to the axial length from the upper end to the lower end of the second coupling portion. Eventually, as mentioned above, the axial distance from the lower end of the first opening area to the lower end of the second opening area becomes larger than the axial distance from the lower end of the first coupling portion to the lower end of the second coupling portion. It is thus possible that when the fuel element is inserted, the lower end of the first coupling portion comes into contact with the lower end of the first opening area, but the lower end of the second coupling portion does not come into contact with the lower end of the second opening area.

In the above fuel spacer, preferably, the length from the upper end of the first opening area to the upper end of the second opening area in the axial direction of the fuel elements is equal to the length from the lower end of the first opening area to the lower end of the second opening area in the axial direction of the fuel elements, and the length from the upper end to the lower end of the first coupling portion in the axial direction of the fuel elements is smaller than the length from the upper end to the lower end of the second coupling portion in the axial direction of the fuel elements.

With such arrangements, the axial length from the upper end to the lower end of the first opening area becomes equal to the axial length from the upper end to the lower end of the second opening area, and the axial length from the upper end to the lower end of the first coupling portion is smaller than the axial length from the upper end to the lower end of the second coupling portion. Eventually, as mentioned above, the axial distance from the lower end of the first opening area to the lower end of the second opening area becomes smaller than the axial distance from the lower end of the first coupling portion to the lower end of the second coupling portion. It is thus possible that when the fuel element is inserted, the lower end of the second coupling portion comes into contact with the lower end of the second opening area, but the lower end of the first coupling portion does not come into contact with the lower end of the first opening area.

In the above fuel spacer, preferably, the length from the upper end of the first opening area to the upper end of the second opening area in the axial direction of the fuel elements is equal to the length from the lower end of the first opening area to the lower end of the second opening area in the axial direction of the fuel elements, and the length from the upper end to the lower end of the first coupling portion in the axial direction of the fuel elements is larger than the length from the upper end to the lower end of the second coupling portion in the axial direction of the fuel elements.

With such arrangements, the axial length from the upper end to the lower end of the first opening area becomes equal to the axial length from the upper end to the lower end of the second opening area, and the axial length from the upper end to the lower end of the first coupling portion is larger than the axial length from the upper end to the lower end of the second coupling portion. Eventually, as mentioned above, the axial distance from the lower end of the first opening area to the lower end of the second opening area becomes larger than the axial distance from the lower end of the first coupling portion to the lower end of the second coupling portion. It is thus possible that when the fuel element is inserted, the lower end of the first coupling portion comes into contact with the lower end of the first opening area, but the lower end of the second coupling portion does not come into contact with the lower end of the second opening area.

In the above fuel spacer, preferably, the first and second coupling portions are each a member in a substantially rectangular tubular shape defining therein a coolant pathway extending in the axial direction of the fuel elements and, of four side walls making up the substantially rectangular tubular shape, two opposed side walls extending substantially parallel to the direction in which the pair of leaf spring portions are exerting pressing forces have the same thickness.

With such arrangements, the hydraulic forces acting on the above two side walls remotest from a straight line connecting two contact points between the leaf spring portions and the fuel elements are equal to each other so that the moments produced by the two hydraulic forces about the straight line are canceled each other to become zero. It is thus possible to suppress the loop-like spring member from rotating about the straight line and to more surely prevent inclination of the loop-like spring member. In addition, since the above two side walls have the same degree of rigidity and the other two side walls are symmetrically deformed with respect to the plane including central axes of two fuel elements, pressing characteristics of the above two side walls upon the fuel elements are improved.

Preferably, there is provided a fuel assembly comprising a plurality of fuel elements and at least one water rod, and fuel spacers for holding the fuel elements and the water rod while keeping certain spacings therebetween.

To achieve the above object, according to the present invention, there is also provided a fuel assembly comprising a plurality of fuel elements and at least one water rod, and fuel spacers for holding the fuel elements and the water rod while keeping certain spacings therebetween, the fuel spacers each comprising a plurality of cylindrical members to which fuel elements are respectively inserted, and a plurality of loop-like spring members held by the cylindrical members for resiliently supporting the fuel elements, the plurality of cylindrical members each including a spring support portion inserted to the loop-like spring member for supporting the loop-like spring member and first and second opening areas formed respectively above and below the spring support portion, the plurality of loop-like spring members each comprising a pair of leaf spring portions and first and second coupling portions for coupling the pair of leaf spring portions at two upper and lower points, wherein the distance from the upper end of the first opening area to the upper end of the second opening area in the axial direction of the fuel elements is substantially equal to the distance from the upper end of the first coupling portion to the upper end of the second coupling portion in the axial direction of the fuel elements, and the distance from the lower end of the first opening area to the lower end of the second opening area in the axial direction of the fuel elements has a different value from the distance from the lower end of the first coupling portion to the lower end of the second coupling portion in the axial direction of the fuel elements.

In the above fuel assembly, preferably, the distance from the lower end of the first opening area of the fuel spacer to the lower end of the second opening area thereof in the axial direction of the fuel elements is smaller than the distance from the lower end of the first coupling portion to the lower end of the second coupling portion in the axial direction of the fuel elements.

In the above fuel assembly, preferably, the length from the upper end to the lower end of the first coupling portion of the fuel spacer in the axial direction of the fuel elements is equal to the length from the upper end to the lower end of the second coupling portion thereof in the axial direction of the fuel elements, and the length from the upper end to the lower end of the first opening area in the axial direction of the fuel elements is larger than the length from the upper end to the lower end of the second opening area in the axial direction of the fuel elements.

In the above fuel assembly, preferably, the first and second coupling portions of the fuel spacer are each a member in a substantially rectangular tubular shape defining therein a coolant pathway extending in the axial direction of the fuel elements and, of four side walls making up the substantially rectangular tubular shape, two opposed side walls extending substantially parallel to the direction in which the pair of leaf spring portions are exerting pressing forces have the same thickness.

DETAILED DESCRIPTION OF THE PREFERRED EMBODIMENTS

Embodiments of the present invention will hereinafter be described with reference to FIGS. 1 to 20.

A first embodiment of the present invention will be described with reference to FIGS. 1 to 12.

Figure 2:
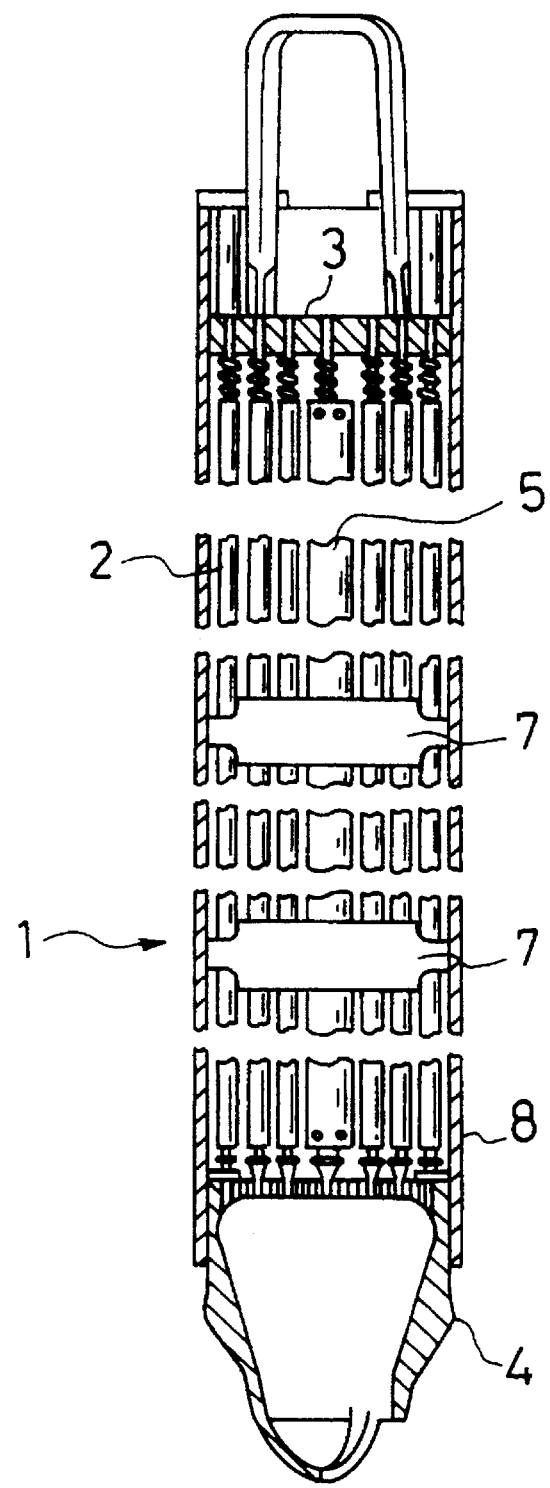
FIG. 2 is a vertical sectional view showing one example of the structure of a fuel assembly for a boiling water reactor.

One exemplary structure of a fuel assembly for use in boiling water reactors is shown in FIG. 2.

In FIG. 2, a fuel assembly 1 comprises 60 rods of fuel elements 2, one water rod 5, fuel spacers 7 for holding the fuel elements 2 and the water rod 5 while keeping certain spacings therebetween, an upper tie plate 3 and a lower tie plate 4 for supporting a bundle of the fuel elements 2 and the water rod 5 at its upper and lower portions, and a channel box 8 surrounding the bundle.

Figure 3:
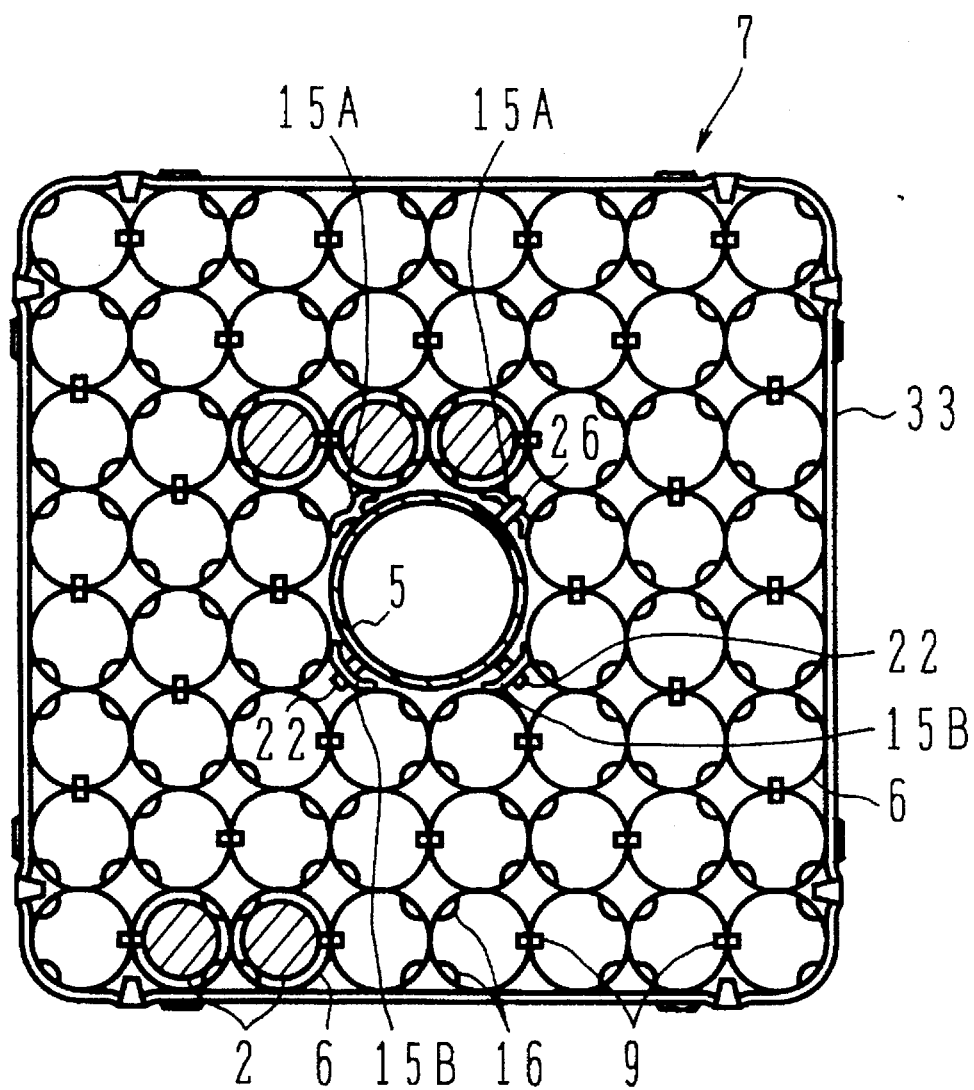
FIG. 3 is a plan view showing the entire structure of the spacer.

This embodiment concerns arrangements of the fuel spacer 7 of which plan view is shown in FIG. 3. Note that, for convenience of explanation, part of the fuel elements 2 and the water rod 5 are illustrated in FIG. 3.

Referring to FIG. 3, the fuel spacer 7 comprises a plurality of round cells 6 to which the fuel elements 2 arrayed in a grid pattern are inserted respectively, a band surrounding the round cells 6 positioned in an outermost periphery from the outer side, and a plurality of loop-like spring members 9 held by the round cells 6 and each resiliently supporting the fuel elements 2, 2 positioned in respective pair of round cells 6 adjacent each other.

Adjacent ones of the plurality of round cells 6 are joined together by welding, and the band 33 is also joined to the adjacent round cells 6 by welding. Further, each of the round cells 6 has two projections 16, 16 formed by projecting parts of its side wall inwardly. Thus, the fuel element 2 inserted to the round cell 6 is supported by two projections 16, 16 and one loop-like spring member 9.

At the center of the fuel spacer 7 in its horizontal section, a space in size just defined by removing four round cells 6 is formed for insertion of the water rod 5. Adjacent twos of the round cells 6 facing the central space are joined to each other by four support plates 15A, 15A, 15B, 15B being in the form of a plate-like bridging member. The two support plates 15B are provided with water rod spring members 22 for resiliently supporting the water rod 5, and one of the two support plates 15A is sandwiched axially of the fuel elements 2 (i.e., in a direction vertical to the drawing sheet)

between projections (tabs) 26 and 26 secured to the water rod 5 by welding, so that the one support plate is supported while being restrained from moving axially of the fuel elements 2. As a result, the plurality of round cells 6 joined together are supported while being restrained from moving axially of the fuel elements 2. Then, the fuel spacers 7 provided in plural around the fuel assembly 1 are disposed with equal intervals in the vertical direction.

Figure 4:
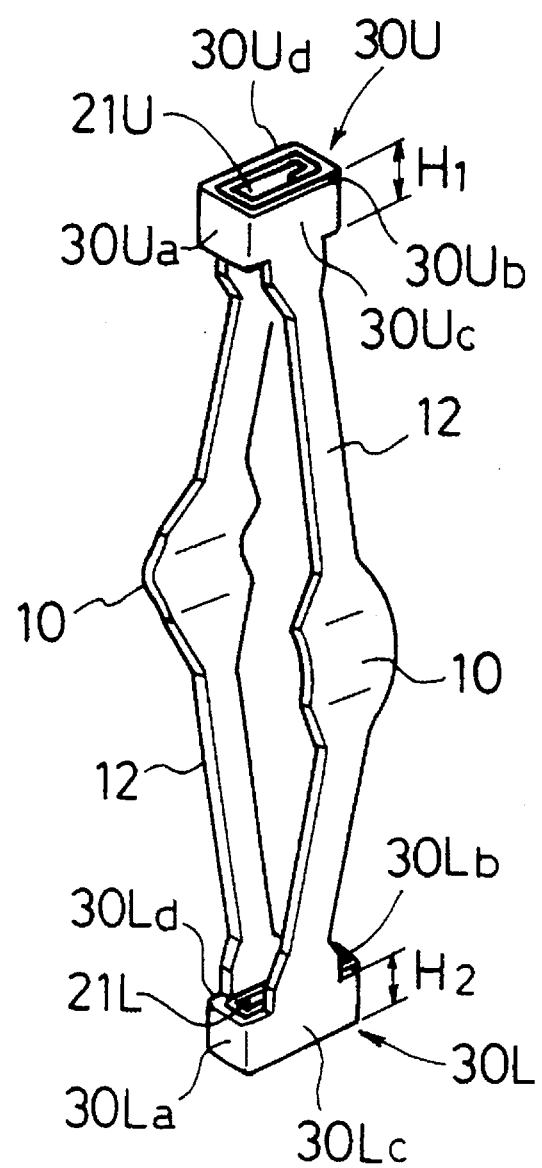
FIG. 4 is a perspective view showing the detailed structure of a loop-like spring member shown in FIG. 3.

The structure of the loop-like spring member 9 is shown in FIG. 4.

Referring to FIG. 4, the loop-like spring member 9 is made of, e.g., a heat-resistant, corrosion-resistant superalloy which is an excellent spring material, and comprises a pair of leaf spring portions 12, 12 and first and second coupling members 30U, 30L for coupling the leaf spring portions 12, 12 to each other respectively at upper and lower ends thereof.

The first and second coupling members 30U, 30L are each formed of two layers of superalloy and have a substantially rectangular tubular shape which is opened in the direction of coolant flow. Coolant pathways 21U, 21L are thereby formed respectively in the first and second coupling members 30U, 30L, allowing a coolant to be introduced axially of the fuel elements 2. Specifically, the first coupling member 30U comprises four side walls 30Ua, 30Ub, 30Uc, 30Ud which are arranged to form a substantially rectangular tubular shape and have the same thickness. Likewise, the second coupling member 30L comprises four side walls 30La, 30Lb, 30Lc, 30Ld which are arranged to form a substantially rectangular tubular shape and have the same thickness. Axial lengths H1, H2 of the first and second coupling members 30U, 30L between their upper and lower ends are equal to each other.

The leaf spring portions 12, 12 are provided with convex portions 10, 10 projecting outwardly from the centers thereof and coming into point contact with the fuel elements 2, the convex portions 10, 10 being formed continuously with the coupling members 30U, 30L in unitary structure.

Figure 5:
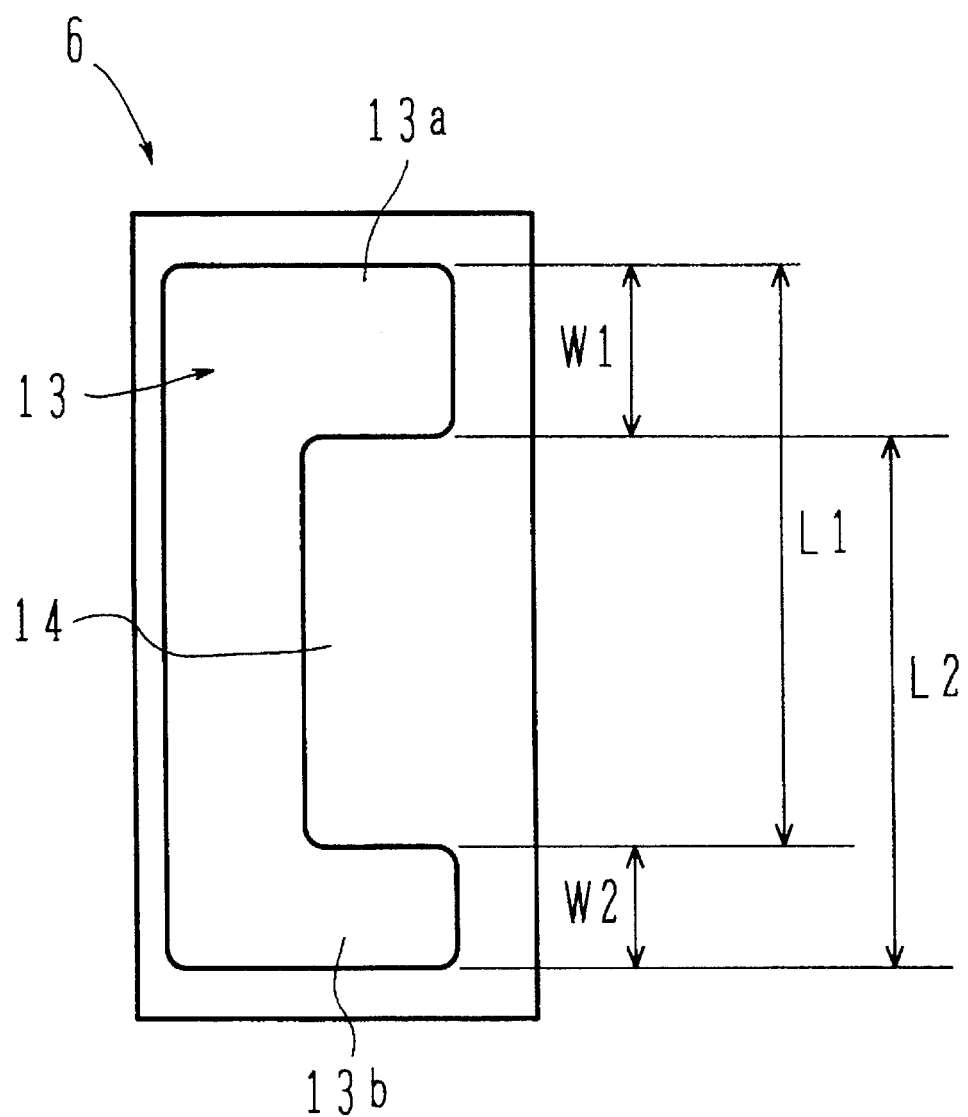
FIG. 5 is a side view showing the detailed structure of a round cell shown in FIG. 3.

FIG. 5 shows a side view of the round cell 6.

Referring to FIG. 5, the round cell 6 has a cutout 13 in the C-shaped form and a projection 14 defined by the formation of the cutout 13.

The cutout 13 includes a first opening area 13a which is formed above the projection 14 and has a length W1 in the axial direction of the fuel elements 2, and a second opening area 13b which is formed below the projection 14 and has a length W2 in the axial direction of the fuel elements 2, the relationship of W1>W2 being held. The distance from the upper end of the first opening area 13a to the upper end of the second opening area 13b in the axial direction of the fuel elements 2 is L1, and the distance from the lower end of the first opening area 13a to the lower end of the second opening area 13b in the axial direction of the fuel elements 2 is L2.

Figure 1:
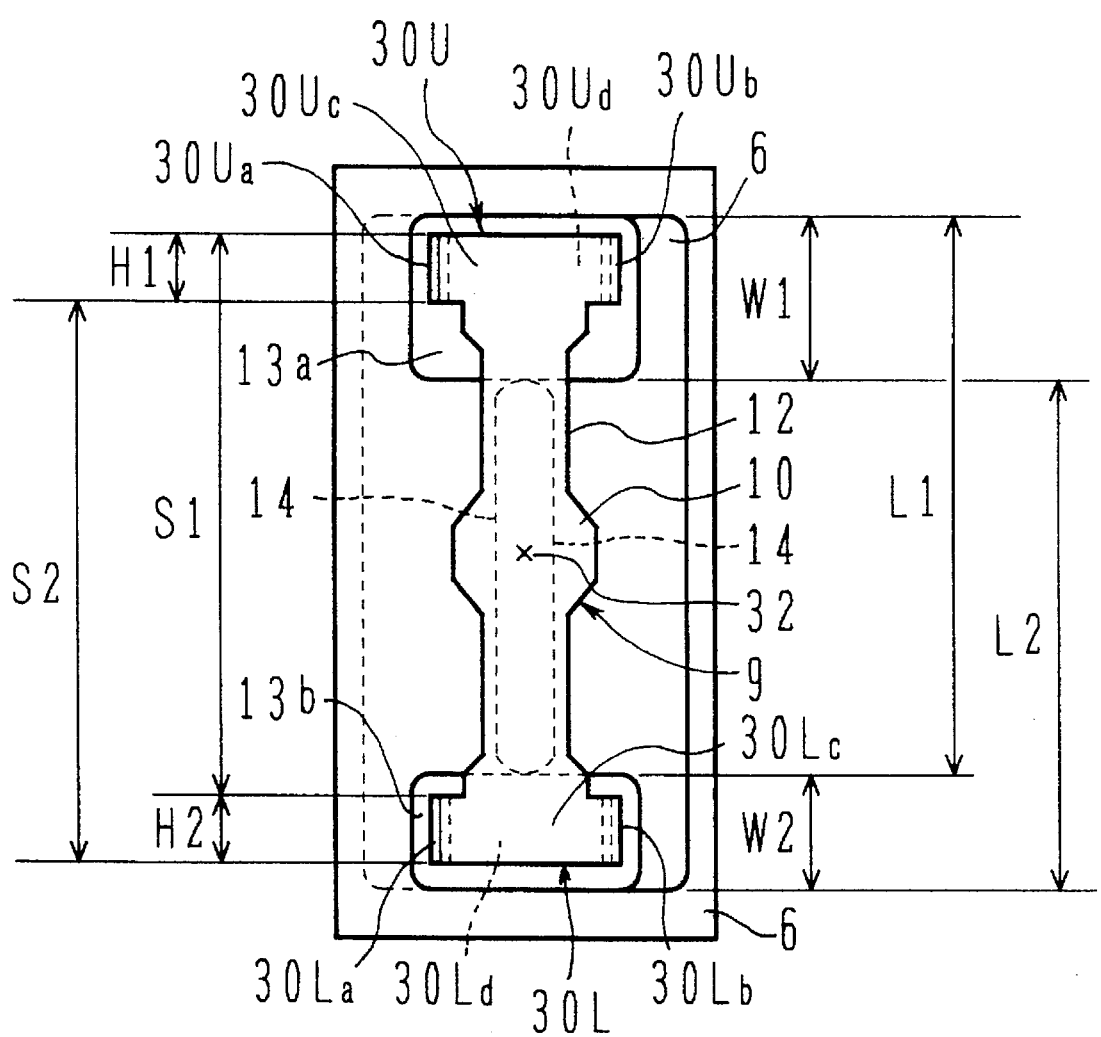
FIG. 1 is a side view showing details of the mounting structure of a loop-like spring member to round cells in a spacer according to a first embodiment of the present invention.
Figure 6:
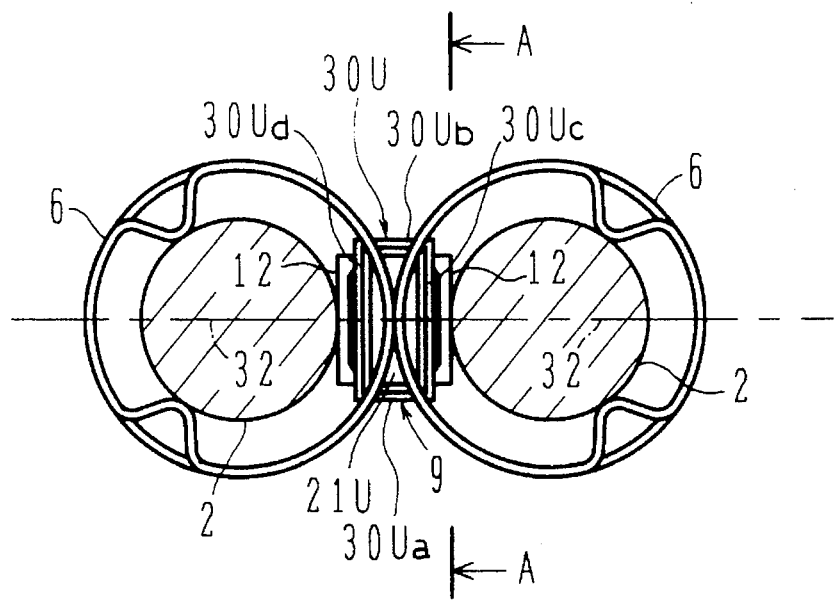
FIG. 6 is a plan view showing details of the mounting structure of the loop-like spring member shown in FIG. 3 to the round cells.

Details of the mounting structure of the loop-like spring member 9 to the round cells 6 are shown in FIGS. 6 and 1. FIG. 6 is a plan view showing a mounted condition of the loop-like spring member 9 to the adjacent round cells 6, 6 and FIG. 1 is a view taken along section A—A in FIG. 6.

Referring to FIGS. 6 and 1, two round cells 6, 6 each having the structure shown in FIG. 5 are welded adjacent each other such that their projections 14, 14 are positioned in overlapping relation, and the loop-like spring member 9 is supported such that the projections 14, 14 of the two round cells 6, 6 are inserted between the pair of leaf spring portions 12 and 12. Note that a straight line 32 is one connecting contact points between the convex portions 10 (see FIG. 4) of the leaf spring portions 12 and two fuel elements 2 adjacent thereto (described later).

In the condition where the loop-like spring member 9 is thus assembled in place, as shown in FIG. 1, the distance S1 from the upper end of the first coupling member 30U of the loop-like spring member 9 to the upper end of the second coupling member 30L in the axial direction of the fuel elements 2 is equal to the aforementioned distance L1 from the upper end of the first opening area 13a to the upper end of the second opening area 13b in the axial direction of the fuel elements 2. But the aforementioned distance L2 from the lower end of the first opening area 13a to the lower end of the second opening area 13b in the axial direction of the fuel elements 2 is smaller than the distance S2 from the lower end of the first coupling member 30U to the lower end of the second coupling member 30L in the axial direction of the fuel elements 2. Accordingly, the relationship L1=S1 and L2<S2 so that L2≠S2 are provided.

The operation of this embodiment arranged as set forth above will be explained below.

Figure 7:
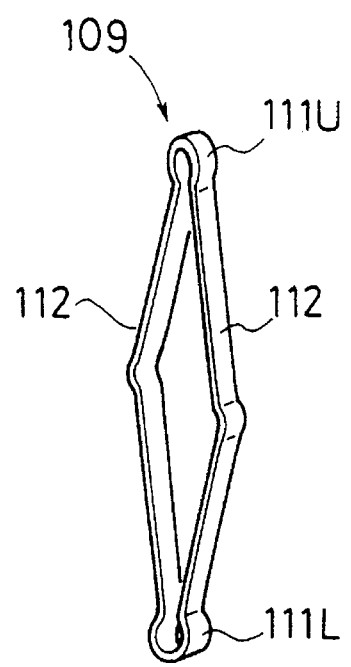
FIG. 7 is a perspective view showing the structure of a loop-like spring member according to a first comparative example for the present invention.

FIG. 7 shows, as a first comparative example for this embodiment, a loop-like spring member 109 according to the prior art disclosed in JP, A, 59-65287.

Referring to FIG. 7, the loop-like spring member 109 comprises a pair of leaf spring portions 112, 112 and first and second coupling members 111U, 111L for coupling the leaf spring portions 112, 112 to each other respectively at upper and lower ends thereof. The first and second coupling members 111U, 111L are not formed to be open in the direction of the coolant flow. Therefore, when the loop-like spring member 109 is set in place to support the fuel elements 2, 2 inserted to the round cells 6, 6, the coupling member blocks the pathway of the coolant flowing through the fuel assembly and impedes flow of the coolant.

More specifically, the coolant flowing into the loop-like spring member 109 is first decelerated by impinging against the second coupling member 111, then changes the direction of flow to be divided into two streams along outer surfaces of the pair of opposed leaf spring portions 112, 112, and thereafter is accelerated while passing narrow gaps between the leaf spring portions and the fuel elements 2. Such a process of deceleration, acceleration and turbulence of the coolant flow due to the pathway being blocked by the coupling member acts to increase the pressure loss.

Figure 8:
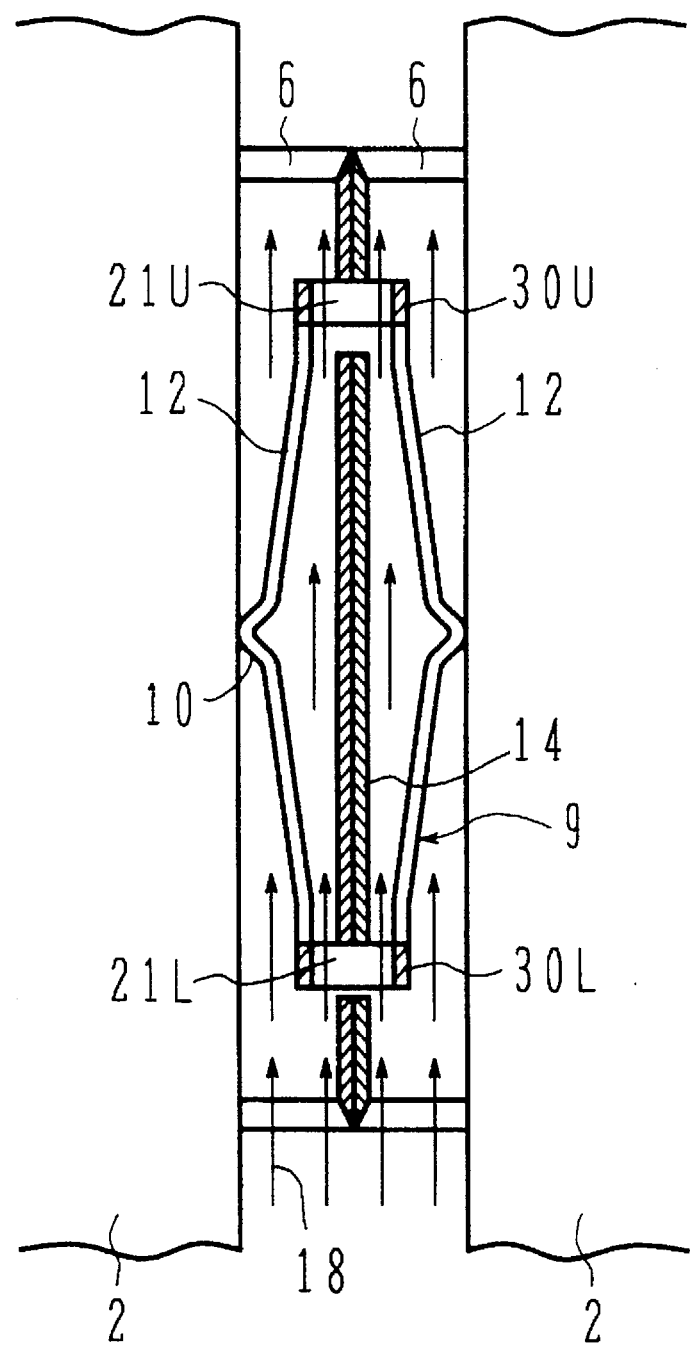
FIG. 8 is a vertical sectional view showing a condition where fuel elements are supported by the loop-like spring member shown in FIG. 4.

By contrast, in the loop-like spring member 9 of this embodiment, the first and second coupling members 30U, 30L are formed respectively to have the coolant pathways 21U, 21L, allowing the coolant to be introduced therethrough in the axial direction of the fuel elements 2. As shown in FIG. 8, therefore, flow 18 of the coming coolant can smoothly pass the coupling members without being blocked by the ends of the loop-like spring member 9, and the coolant flow is less subjected to deceleration, acceleration and turbulence of the coolant flow. As a result, an increase in the pressure loss caused by the loop-like spring member 9 can be prevented.

A description will now be made of an action of preventing inclination of the loop-like spring member 9 and reducing the pressure loss in this embodiment. Note that the members already explained above are denoted by the same reference numerals.

Generally, in a fuel assembly of reactors under operation, the fuel elements 2 and the water rod 5 tend to expand in the axial direction due to thermal expansion and other causes. Thus, the fuel elements 2 and the water rod 5 expand upwardly with the position of the lower tie plate 4 supporting them as a reference. At this time, the fuel elements 2 as heat radiating bodies expand in a larger amount than the water rod 5 as an a heat non-radiating body.

In the fuel spacer 7 of this embodiment arranged as set forth above, each of the loop-like spring members 9 resiliently supports the fuel elements 2 inserted to the round cells 6 adjacent each other, while the round cells 6 are axially supported by the water rod 5 through the projections (tabs) 26 provided on the water rod 5. Therefore, the loop-like spring members 9 and the round cells 6 are forced to move upwardly in the axial direction of the fuel elements 2 respectively following axially upward expansion of the fuel elements 2 and the water rod 5. Then, the amount by which the loop-like spring members 9 are moved is larger than the amount by which the round cells 6 are moved. Accordingly, the loop-like spring members 9 are moved relatively upwardly with respect to the round cells 6.

Figure 9:
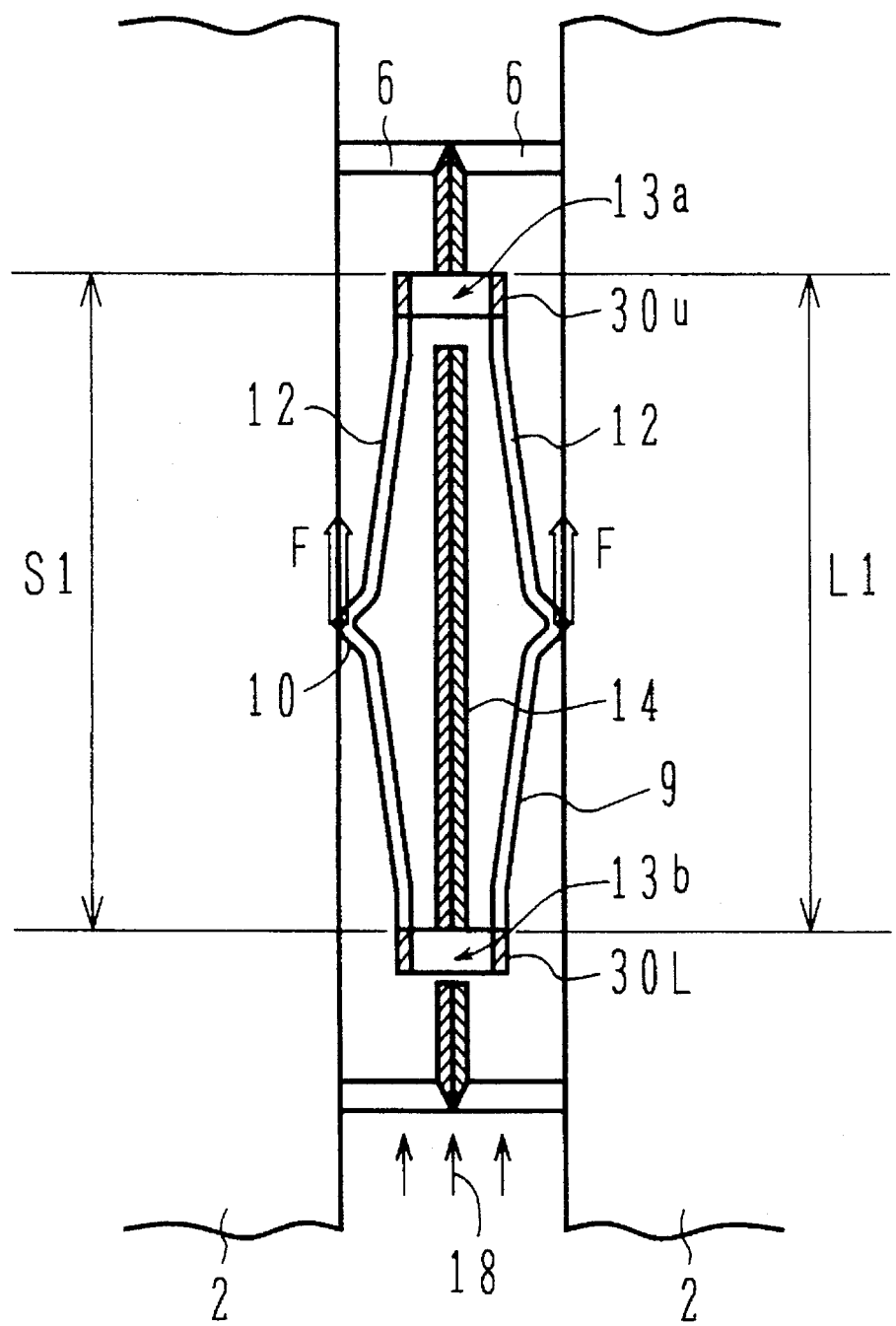
FIG. 9 is a vertical sectional view showing a condition where fuel elements are supported by the loop-like spring member shown in FIG. 4.

Now in the fuel spacer 7 of this embodiment, as shown in FIG. 1, the axial distance L1 from the upper end of the first opening area 13a of the round cell 6 to the upper end of the second opening area 13b is equal to the axial distance S1 from the upper end of the first coupling member 30U of the loop-like spring member 9 to the upper end of the second coupling member 30L. With this arrangement, when the loop-like spring member 9 is moved relatively upwardly with respect to the round cells 6, the upper end of the second coupling member 30L of the loop-like spring member 9 first comes into contact with the upper end of the second opening area 13b of each round cell 6 and, in this condition, the loop-like spring member 9 is then subjected at its convex portions 10 to forces F, F imposed from the left and right fuel elements 2, 2 to act upwardly, as shown in FIG. 9. Accordingly, even if the direction of central axis of the loop-like spring member 9 (i.e., of an axis connecting the centers of the first and second coupling members 30U, 30L) is initially inclined out of alignment with the direction of the coolant flow 18, the direction of central axis of the loop-like spring member 9 is corrected by the action of the forces F, F imposed after the contact between the loop-like spring member 9 and the fuel elements 2. As a result, the direction of central axis of the loop-like spring member 9 is aligned with the direction of the coolant flow 18 and, thereafter, the loop-like spring member will not incline relative to the coolant flow 18. At this time, since the upper end of the first coupling member 30U of the loop-like spring member 9 simultaneously contacts the upper end of the first opening area 13a of each round cell 6, the loop-like spring member 9 is held in the condition where the direction of central axis of the loop-like spring member 9 is aligned with the direction of the coolant flow 18 and then stably maintained in the aligned condition. Incidentally, the effect of reducing pressure loss of the coolant, resulted from preventing inclination of the loop-like spring member 9, can be achieved regardless of the configuration of the loop-like spring member 9.

In this embodiment, an action of preventing inclination of the loop-like spring member based on even distribution of hydrodynamic forces can also be produced in addition to the above-explained effect of preventing inclination of the loop-like spring member 9 by utilization of the forces imposed from the fuel elements 2, 2.

Figure 10:
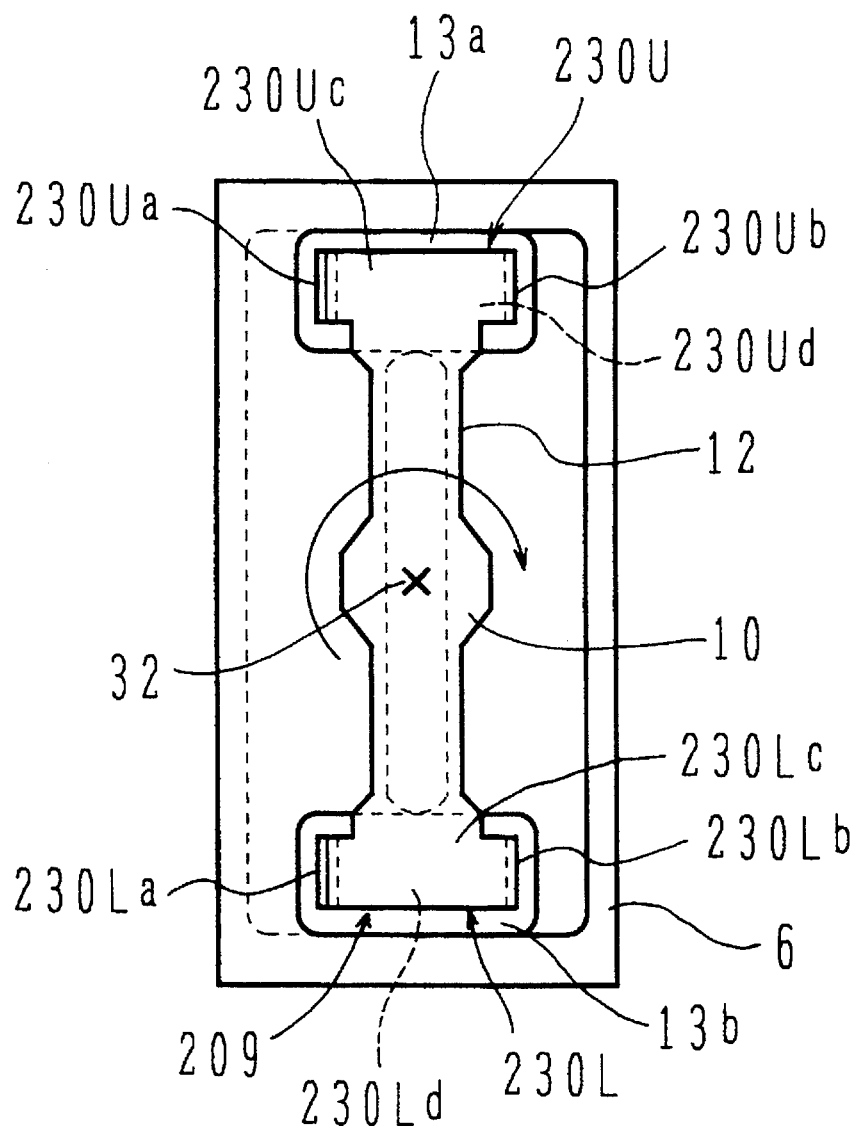
FIG. 10 is a side view showing details of the mounting structure of a loop-like spring member to round cells in a spacer according to a second comparative embodiment for the present invention.

FIG. 10 shows a condition where a loop-like spring member 209 as a second comparative example for this embodiment is assembled in the round cells 6. FIG. 10 corresponds to FIG. 1 showing this embodiment and identical members to those in FIG. 1 are denoted by the same reference numerals.

Referring to FIG. 10, the loop-like spring member 209 of this comparative example is different from the loop-like spring member 9 of this embodiment shown in FIGS. 4 and 1 in the structure of four side walls formed by the first and second coupling members 30U, 30L in a substantially rectangular tubular shape. More specifically, in the first coupling member 230U of the loop-like spring member 209, only 230Ua of four side walls 230Ua, 230Ub, 230Uc, 230Ud is formed of two layers of superalloy, and the remaining side walls 230Ub, 230Uc, 230Ud are formed of a single layer of superalloy. Likewise, of four side walls 230La, 230Lb, 230Lc, 230Ld of the second coupling member 230L, only 230La is formed of two layers of superalloy and the remainders 230Lb, 230Lc, 230Ld are formed of a single layer of superalloy.

Taking that point in FIG. 10, the loop-like spring member 209 is asymmetrical with respect to a straight line 32 (see FIG. 6) connecting the contact points between convex portions 10 (see FIG. 4) of leaf spring portions 12 and two fuel elements 2 adjacent thereto such that the side walls 230Ua and 230La on the left side of the straight line 32 are thicker than the side walls 230Ub and 230Lb on the right side. Therefore, when the coolant flows into the loop-like spring member 209 from below, the hydraulic force acting on the left-hand side walls 230Ua and 230La is greater than the hydraulic force acting on the right-hand side walls 230Ub and 230Lb. Thus, the structure of the loop-like spring member 209 is apt to rotate as indicated by arrow about the straight line 32 as an axis.

By contrast, in the fuel spacer 7 of this embodiment, the four side walls 30Ua, 30Ub, 30Uc, 30Ud of the first coupling member 30U making up the substantially rectangular tubular shape all have the same thickness and, likewise, the four side walls 30La, 30Lb, 30Lc, 30Ld of the second coupling member 30L making up the substantially rectangular tubular shape all have the same thickness, as also seen from FIG. 1. In other words, the side walls 30Ua and 30La on the left side of the straight line 32 and the side walls 30Ub and 30Lb on the right side thereof are all formed of two layers of superalloy and their thicknesses are equal to each other. Therefore, the hydraulic forces acting on the left-hand side wall and the right-hand side wall remotest from the straight line 32 are equal to each other so that the moments or rotating forces produced by the two hydraulic forces are canceled each other to become zero. It is thus possible to suppress the loop-like spring member 9 from rotating about the straight line 32 and to more surely prevent inclination of the loop-like spring member 9.

The foregoing description is made of the generation of rotating forces due to the difference in thickness between the left-hand side walls 230Ua, 230La and the right-hand side walls 230Ub, 230Lb with respect to the straight line 32, i.e., of two opposed side walls extending substantially parallel to the direction in which the leaf spring portions 12, 12 are exerting their resilient forces. Similarly, rotating forces are also generated when there is a difference in thickness between the remaining side walls, i.e., the side walls 230Uc, 230Lc and the side walls 230Ud, 230Ld. In this case, however, since the direction in which the rotating forces are generated is the same as the direction in which the leaf spring portions 12, 12 are exerting their resilient forces, reaction forces are produced by the friction forces between the leaf spring portions 12, 12 and the fuel elements 2 to cancel the rotating forces. Eventually, the wall thickness and the number of wall layers in the pressing direction of the leaf spring portions are not important. To prevent the generation of the rotating forces, it is thus sufficient that the side walls 230Ua, 230La and the side walls 230Ub, 230Lb (the side walls 30Ua, 30La and the side walls 30Ub, 30Lb in this embodiment) opposing to each other and being substantially parallel to the pressing direction of the leaf spring portions 12, 12 have the same thickness.

The effect of improving the assembly efficiency in this embodiment will now be described.

Figure 11:
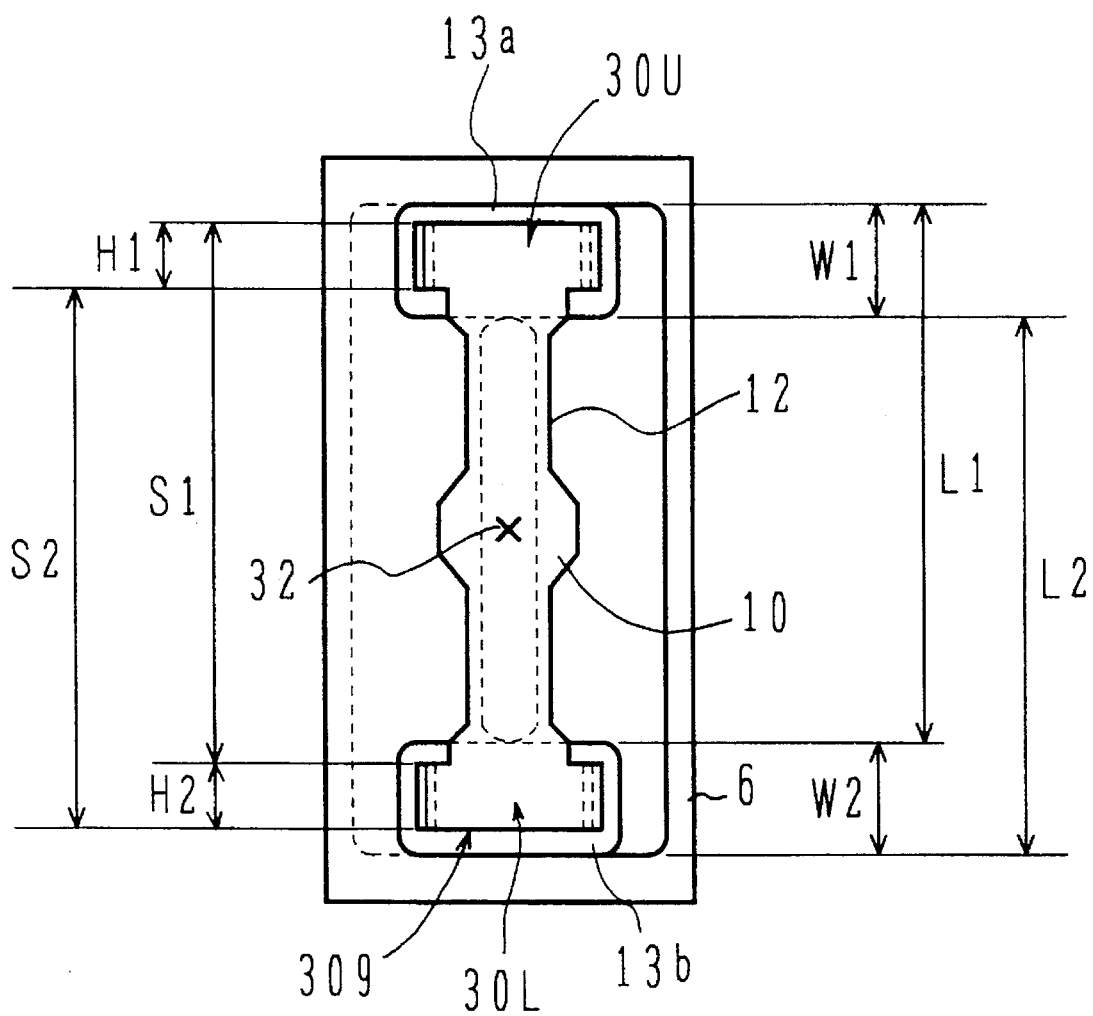
FIG. 11 is a side view showing details of the mounting structure of a loop-like spring member to round cells in a spacer according to a third comparative embodiment for the present invention.

FIG. 11 shows a condition where a loop-like spring member 309 as a third comparative example for this embodiment is assembled in the round cells 6. FIG. 11 corresponds to FIG. 1 showing this embodiment and identical members to those in FIG. 1 are denoted by the same reference numerals.

Referring to FIG. 11, the loop-like spring member 309 of this comparative example is different from the loop-like spring member 9 of this embodiment shown in FIGS. 4 and 1 in that the distance L2 from the lower end of the first opening area 13a to the lower end of the second opening area 13b in the axial direction of the fuel elements 2 is equal to the distance S2 from the lower end of the first coupling member 30U to the lower end of the second coupling member 30L in the axial direction of the fuel elements 2. Other arrangements of the loop-like spring member 309 are basically similar to those of the loop-like spring member 9 of the first embodiment, including that the distance L1 from the upper end of the first opening area 13a to the upper end of the second opening area 13b in the axial direction of the fuel elements 2 is equal to the distance S1 from the upper end of the first coupling member 30U to the upper end of the second coupling member 30L in the axial direction of the fuel elements 2, and that the length W1 from the upper end to the lower end of the first opening area 13a in the axial direction of the fuel elements 2 is equal to the length W2 from the upper end to the lower end of the second opening area 13b in the axial direction of the fuel elements 2.

Generally, in a step of inserting fuel elements as one of assembly steps for a fuel assembly, because the fuel elements 2 are inserted from above, the loop-like spring members 9 contacting the fuel elements 2 are pushed by the force applied to insert the fuel elements 2 and moved downwardly in the axial direction. On this occasion, because the distance L2 from the lower end of the first opening area 13a to the lower end of the second opening area 13b in the axial direction of the fuel elements 2 is equal to the distance S2 from the lower end of the first coupling member 30U to the lower end of the second coupling member 30L in the axial direction of the fuel elements 2 in the fuel spacer 309 of the third comparative example, at the same time as when the lower end of the first coupling member 30U comes into contact with the lower end of the first opening area 13a, the lower end of the second coupling member 30L comes into contact with the lower end of the second opening area 13b. Accordingly, the loop-like spring member 309 will not smoothly move and the friction force produced upon the fuel element 2 passing through the fuel spacer 7 is increased. It is thus difficult to insert the fuel elements 2, impeding an improvement in the efficiency of assembly.

In the fuel spacer 7 of this embodiment, however, the distance L2 from the lower end of the first opening area 13a to the lower end of the second opening area 13b in the axial direction of the fuel elements 2 is smaller than the distance S2 from the lower end of the first coupling member 30U to the lower end of the second coupling member 30L in the axial direction of the fuel elements 2, as explained above by referring to FIG. 1. Therefore, when the fuel element 2 is inserted, the lower end of the second coupling member 30L comes into contact with the lower end of the second opening area 13b, but the lower end of the first coupling member 30U does not come into contact with the lower end of the first opening area 13a. Stated otherwise, the upper end portion of the loop-like spring member 9 can freely be moved to ensure a space necessary for the initial stage of insertion of the fuel element 2, and the friction force produced during passage of the fuel element 2 along the loop-like spring member 9 is reduced. As a result, the fuel element 2 can be inserted more easily and the assembly efficiency can be improved.

Furthermore, an action of improving pressing characteristics can also be obtained as follows in this embodiment.

As explained above in connection with FIG. 1, in the fuel spacer 7 of this embodiment, the opposed side walls 30Ua, 30Ub and the opposed side walls 30La, 30Lb, which are extending substantially parallel to the pressing direction of the leaf spring portions 12, 12 have the same thickness. Looking the first coupling member 30U in FIG. 6 as an example, therefore, the side wall 30Ua and the side wall 30Ub have the same degree of rigidity and the other two side walls 30Uc, 30Ud are symmetrically deformed with respect to the plane including central axes of two fuel elements 2 (i.e., the plane represented by the straight line 32 in FIG. 6). As a result, pressing characteristics of the two side walls 30Uc, 30Ud upon the fuel elements 2 are improved. Likewise, for the second coupling member 30L, pressing characteristics of the two side walls 30Lc, 30Ld upon the fuel elements 2 are also improved.

According to the fuel spacer 7 of this embodiment, as described above, when the loop-like spring member 9 is moved relatively upwardly with respect to the round cells 6, the upper end of the second coupling member 30L first comes into contact with the upper end of the second opening area 13b of each round cell 6 and, in this condition, the loop-like spring member 9 is then subjected to forces F, F imposed from the left and right fuel elements 2, 2 to act upwardly. Therefore, the direction of central axis of the loop-like spring member 9 is corrected to be aligned with the direction of the coolant flow 18 and will not incline therefrom. At the same time, since the upper end of the first coupling member 30U of the loop-like spring member 9 contacts the upper end of the first opening area 13a of each round cell 6, the condition where the direction of central axis of the loop-like spring member 9 is aligned with the direction of the coolant flow 18 is held and then stably maintained. In addition, since the first and second coupling members 30U, 30L define the coolant pathways 21U, 21L therein, smooth flow of the coolant can be ensured. Thus, the pressure loss of the coolant can sufficiently be reduced.

Also, of the four side walls 30Ua–30Ud and 30La–30Ld of the first and second coupling members 30U, 30L making up the substantially rectangular tubular shape, the two opposed side walls 30Ua, 30Ub and the two opposed side walls 30La, 30Lb, which are extending substantially parallel to the pressing direction of the leaf spring portions 12, 12, have the same thickness. Therefore, the loop-like spring member 9 is suppressed from rotating about the straight line 32 connecting the two contact points between the leaf spring portions 12 and the fuel elements 2, making it possible to more surely prevent inclination of the loop-like spring member 9.

Further, since the distance L2 from the lower end of the first opening area 13a to the lower end of the second opening area 13b in the axial direction of the fuel elements 2 is smaller than the distance S2 from the lower end of the first coupling member 30U to the lower end of the second coupling member 30L in the axial direction of the fuel elements 2, when the fuel element 2 is inserted, the lower end of the second coupling member 30L comes into contact with the lower end of the second opening area 13b, but the lower end of the first coupling member 30U does not come into contact with the lower end of the first opening area 13a. Accordingly, the fuel element 2 can be inserted more easily and the assembly efficiency can be improved.

Moreover, since, of the four side walls 30Ua–30Ud and 30La–30Ld of the first and second coupling members 30U, 30L making up the substantially rectangular tubular shape, the two opposed side walls 30Ua, 30Ub and the two opposed side walls 30La, 30Lb, which are extending substantially parallel to the pressing direction of the leaf spring portions 12, 12, have the same thickness, each pair of side walls have the same degree of rigidity and characteristics of the other pairs of side walls 30Uc, 30Ud and 30Lc, 30Ld upon the fuel elements 2 are improved.

As explained in connection with the above embodiment, the condition for preventing inclination of the loop-like spring member 9 is S1=L1, and the condition for improving the assembly efficiency is L2<S2. But the condition of L2<S2 is met if S1=L1, H1=H2 and W1>W2 are held. This point will be described below with reference to FIG. 12.

Figure 12:
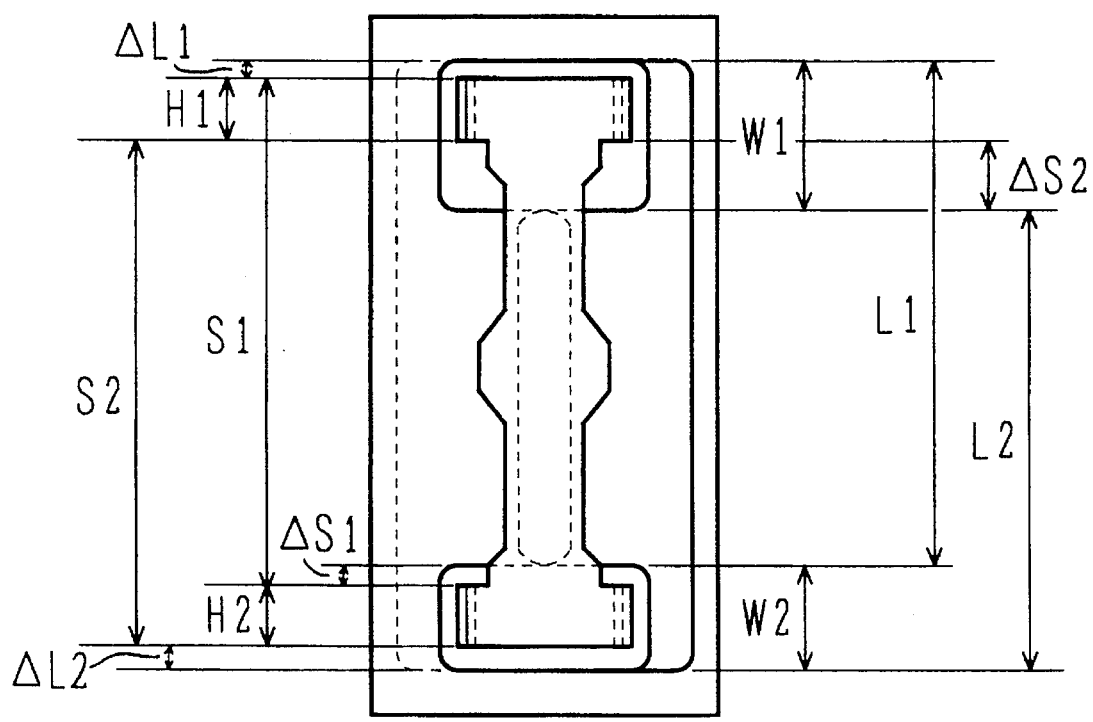
FIG. 12 is a view for explaining that L2<S2 holds on condition of S1=L1, H1=H2 and W1>W2.

In FIG. 12, excluding the overlapped portion between L2 and S2, the condition of L2<S2 is equally represented by L2<S2. This means that if L2<S2 is proved, L2<S2 is also proved.

Given S1=L1, this relationship is equally represented S1=L1, excluding the overlapped portion between S1 and L1. Also, on an assumption of H1=H2 and W1>W2, S2 >L2.

From the above, on condition of S1=L1, H1=H2 and W1>W2, the relationship of L2<S2 is held. In other words, if S1=L1, H1=H2 and W1>W2 are satisfied, the effect of improving the assembly efficiency can be achieved.

In practice, it is difficult in the above embodiment to strictly meet the condition of L1=S1, i.e., the condition that the axial distance L1 from the upper end of the first opening area 13a of the round cell 6 to the upper end of the second opening area 13b is equal to the axial distance S1 from the upper end of the first coupling member 30U to the upper end of the second coupling member 30L. Therefore, it is practically contemplated that, in anticipation of manufacture tolerance of 1% for each of the loop-like spring member 9 and the round cell 6, S1 and L1 are substantially equal to each other if the difference between S1 and L1 is not larger than 2% of the total length of the loop-like spring member 9, and that the effect of preventing inclination of the loop-like spring member 9 is achieved as with the foregoing case of exactly meeting S1=L1.

Likewise, it is also contemplated that the condition of L2<S2, i.e., the condition that the distance L2 from the lower end of the first opening area 13a to the lower end of the second opening area 13b in the axial direction of the fuel elements 2 is smaller than the distance S2 from the lower end of the first coupling member 30U to the lower end of the second coupling member 30L in the axial direction of the fuel elements 2, is satisfied if the difference between S2 and L2 is larger than 2% of the total length of the loop-like spring member 9 in anticipation of manufacture tolerance of 1% for each of the loop-like spring member 9 and the round cell 6, and that the effect of improving the assembly efficiency is achieved as with the foregoing case of exactly meeting L2<S2.

A second embodiment of the present invention will be described with reference to FIGS. 13 to 15. This embodiment has different arrangements in the round cell and the loop-like spring member. Note that identical members to those in the first embodiment are denoted by the same reference numerals.

Figure 13:
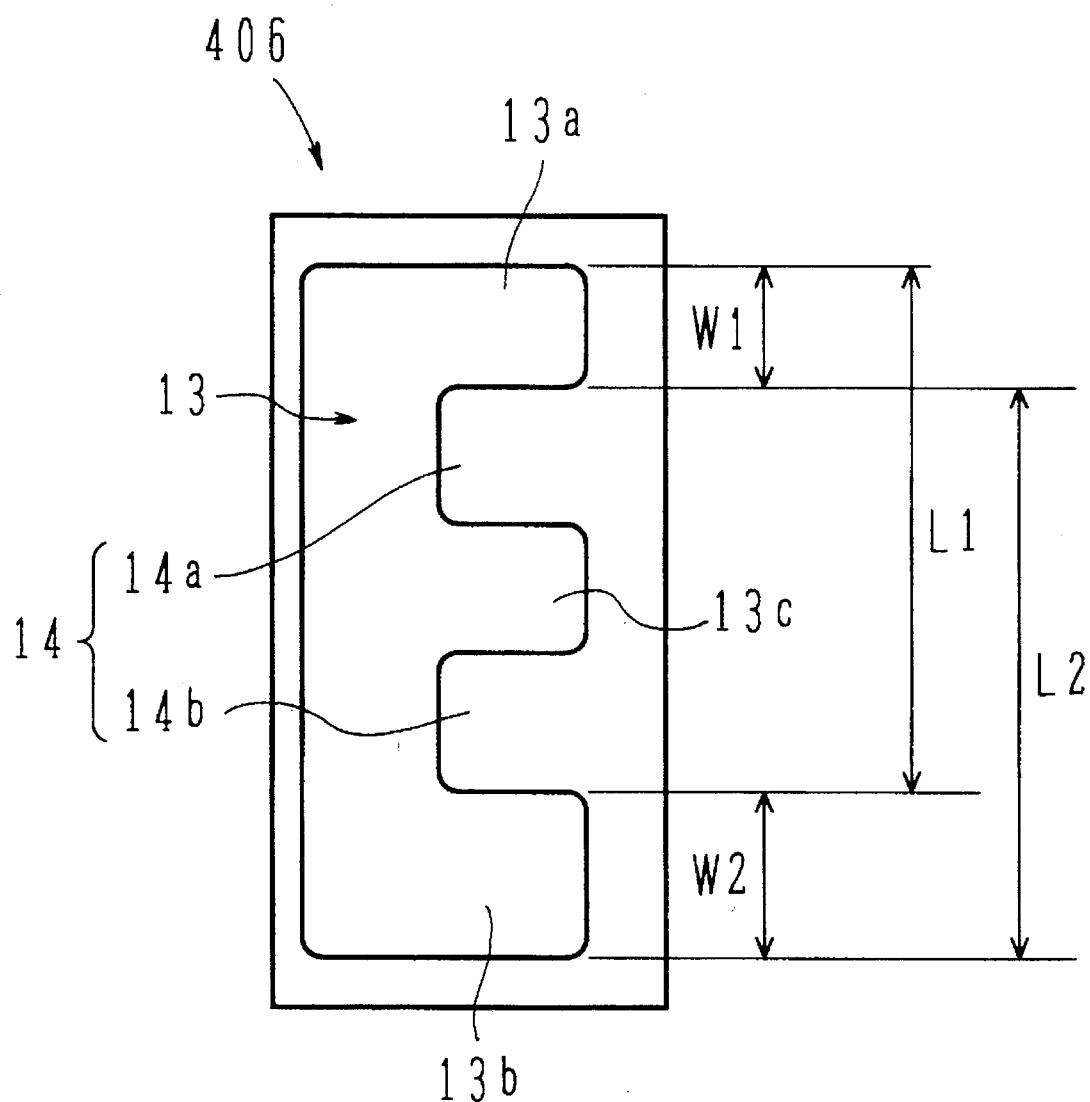
FIG. 13 is a side view showing the structure of a round cell according to a second embodiment of the present invention.
Figure 14:
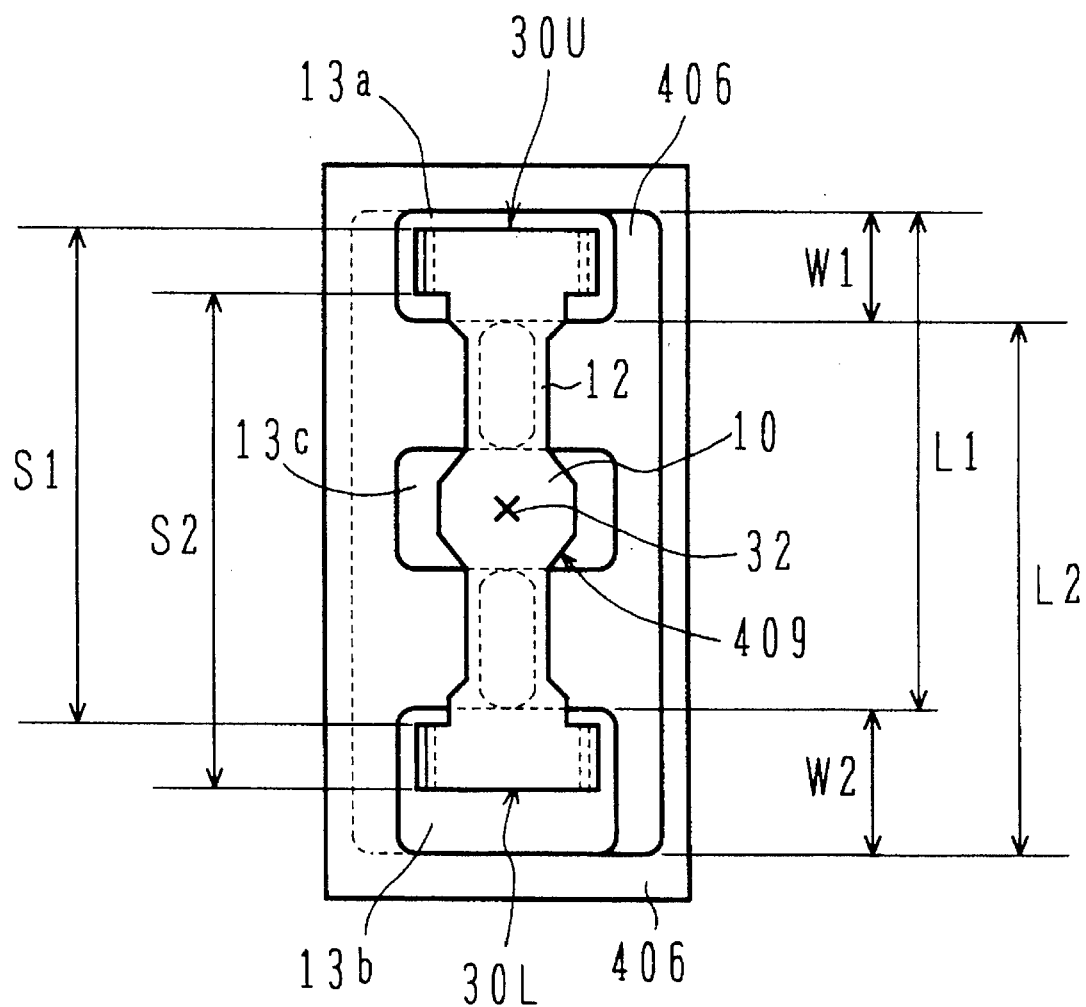
FIG. 14 is a side view showing details of the mounting structure of a loop-like spring member to the round cells shown in FIG. 13.
Figure 15:
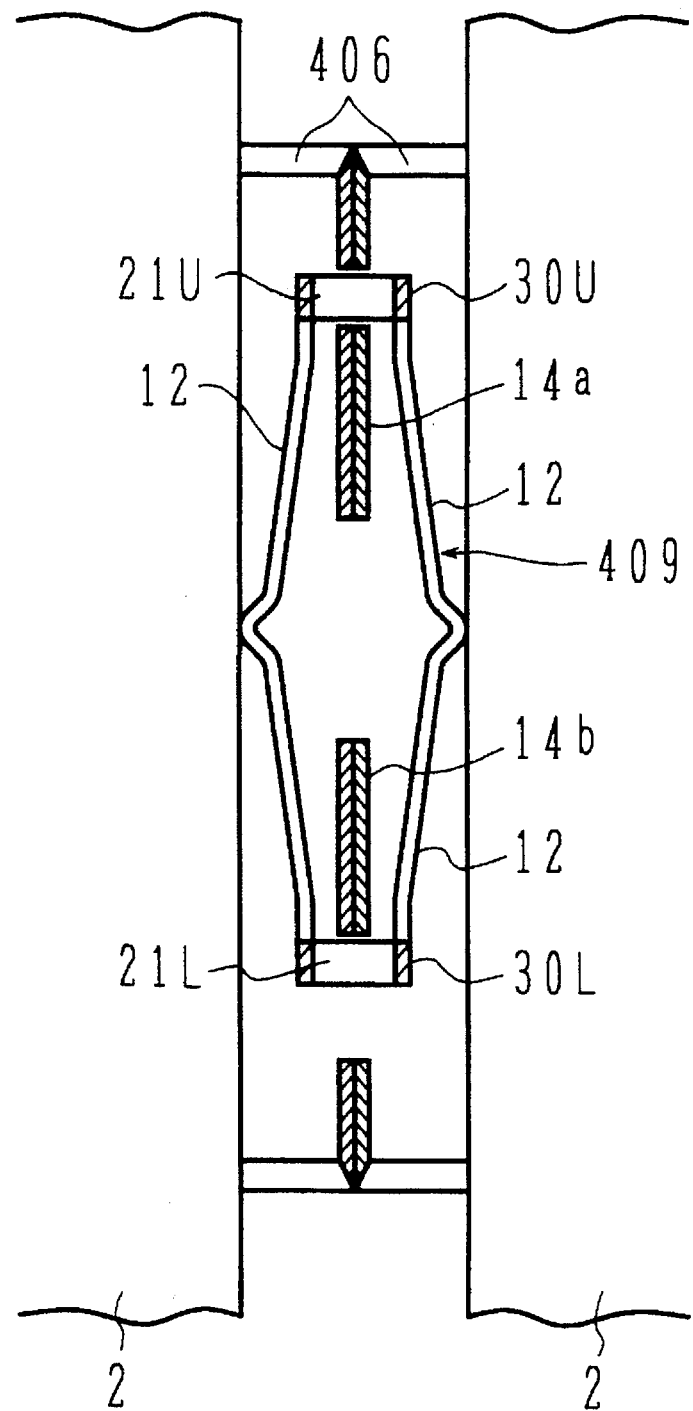
FIG. 15 is a vertical sectional view showing a condition where fuel elements are supported by the loop-like spring member.

FIG. 13 shows a side view of a round cell 406 of this embodiment, FIG. 14 shows a condition where a loop-like spring member 409 is assembled in the round cell 406, and FIG. 15 shows, in a side view, a condition where the fuel elements 2, 2 are supported by the loop-like spring member 409. FIGS. 13, 14 and 15 correspond respectively to FIGS. 5, 1 and 9 for the first embodiment.

Referring to FIGS. 13 to 15, this second embodiment is mainly different from the first embodiment in that, as with a cylindrical member 3A shown in FIG. 1 of the above-cited JP, B, 3-76879, the round cell 406 has an E-shaped cutout 13 and two projections 14a, 14b are formed to define a third opening area 13c in addition to the first and second opening areas 13a, 13b, that the length W1 of the first opening area 13a in the axial direction of the fuel elements 2 is smaller than the length W2 of the second opening area 13b in the axial direction of the fuel elements 2, and that the distance L2 from the lower end of the first opening area 13a to the lower end of the second opening area 13b in the axial direction of the fuel elements 2 is larger than the distance S2 from the lower end of the first coupling member 30U to the lower end of the second coupling member 30L in the axial direction of the fuel elements 2.

The remaining structure is basically similar to that of the first embodiment, including that the distance S1 from the upper end of the first coupling member 30U to the upper end of the second coupling member 30L in the axial direction of the fuel elements 2 is equal to the distance L1 from the upper end of the first opening area 13a to the upper end of the second opening area 13b in the axial direction of the fuel elements 2. Additionally, in this embodiment, the projections 14a and 14b inserted to the loop-like spring member 9 constitute spring support members for supporting the loop-like spring member 9.

In the above arrangements, when the fuel element 2 is inserted, the lower end of the first coupling member 30U comes into contact with the lower end of the first opening area 13a, but the lower end of the second coupling member 30L does not come into contact with the lower end of the second opening area 13b. Stated otherwise, the lower end portion of the loop-like spring member 409 can freely be moved and the friction force produced during passage of the fuel element 2 along the loop-like spring member 409 is reduced. As a result, the effect of improving the assembly efficiency can be achieved as with the first embodiment. The other advantages can also be achieved as with the first embodiment.

While the condition for improving the assembly efficiency in the second embodiment is L2>S2, it is needless to say that the condition of L2>S2 is met if L1=S1, H1 =H2 and W1<W2 are held, similarly following the above explanation made for the first embodiment with reference to FIG. 12. Also, the condition for improving the assembly efficiency in the first embodiment was L2<S2. Combining those conditions together, the condition for improving the assembly efficiency is expressed by L2>S2. Then, this condition is satisfied if L1=S1, H1=H2 and W1<W2 are held.

Further, although the projection 14 comprises the two projections 14a, 14b in the above second embodiment, it may be divided into three or more projections in the vertical direction and, in any of the modified cases, the similar advantages are obtained.

A third embodiment of the present invention will be described with reference to FIGS. 16 to 18. This embodiment has different structures in the loop-like spring member and the first and second coupling members.

Figure 16:
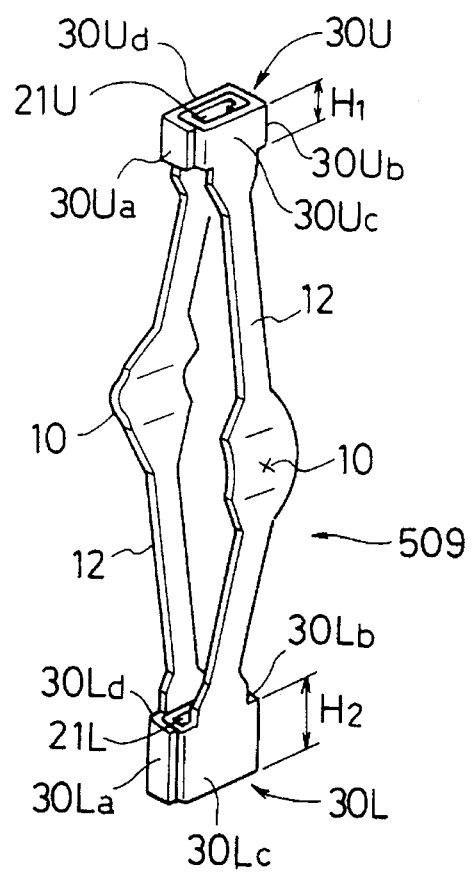
FIG. 16 is a perspective view showing the structure of a loop-like spring member according to a third embodiment of the present invention.
Figure 17:
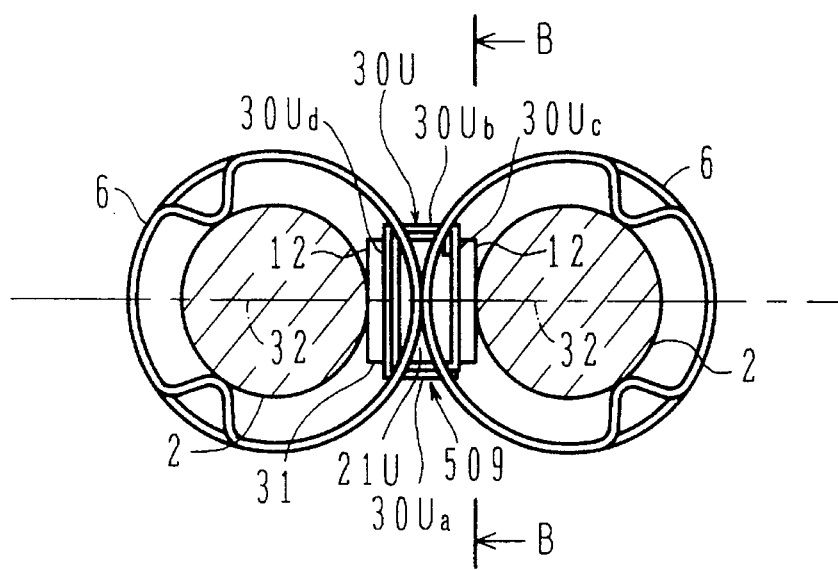
FIG. 17 is a plan view showing a mounting condition of the loop-like spring member shown in FIG. 16 to round cells.
Figure 18:
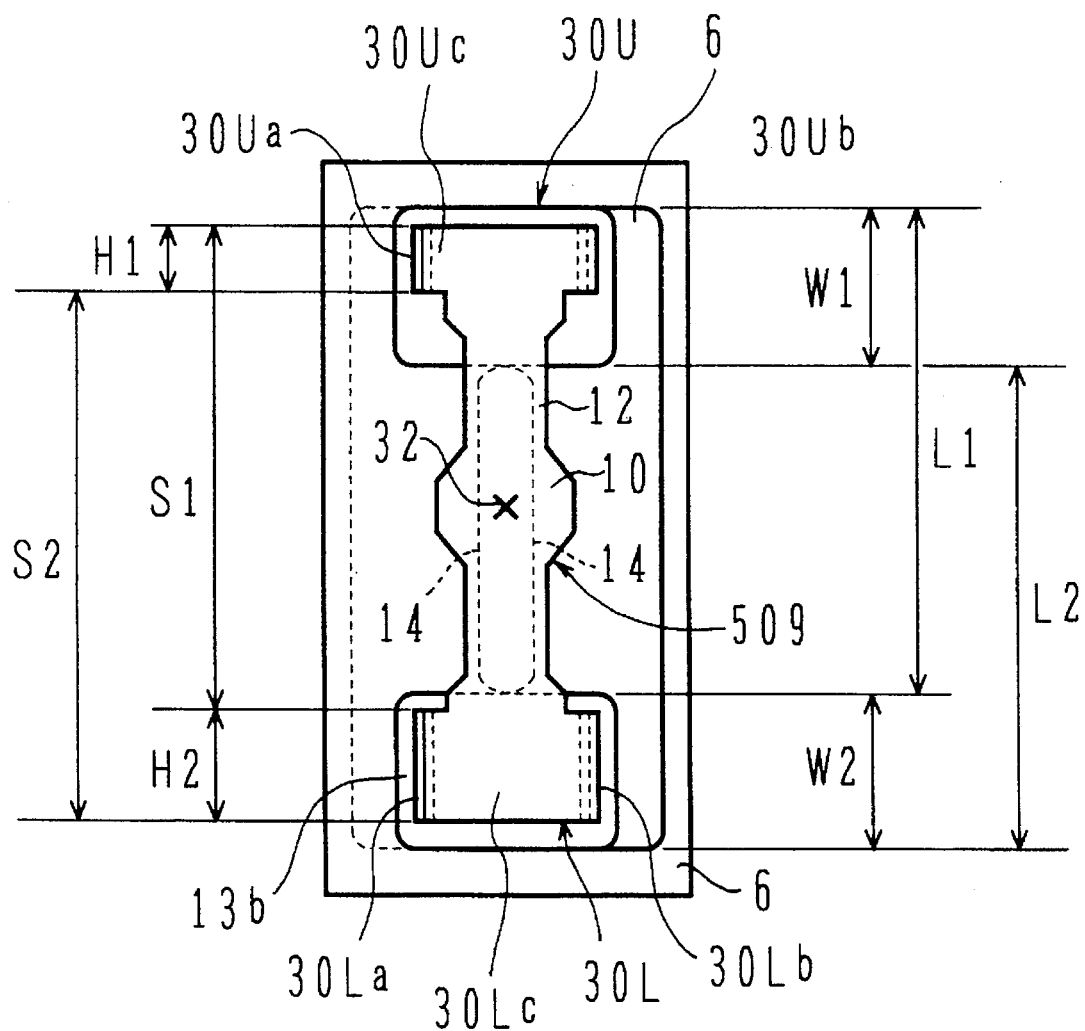
FIG. 18 is a view taken along section B—B in FIG. 17.

FIG. 16 shows the structure of a loop-like spring member 509 of this embodiment, FIG. 17 shows, in a plan view, a mounted condition of the loop-like spring member 509, and FIG. 18 shows a view taken along section B—B in FIG. 17. FIGS. 16, 17 and 18 correspond respectively to FIGS. 4, 6 and 1 for the first embodiment. Note that identical members to those in the first embodiment are denoted by the same reference numerals.

Referring to FIGS. 16 to 18, the loop-like spring member 509 of this third embodiment is mainly different from the loop-like spring member 9 of the first embodiment in that the length H1 from the upper end to the lower end of the first coupling member 30U in the axial direction of the fuel elements 2 is smaller than the length H2 from the upper end to the lower end of the second coupling member 30L in the axial direction of the fuel elements 2, that of the four side walls 30Ua, 30Ub, 30Uc, 30Ud of the first coupling member 30U, the side walls 30Ua, 30Ub, 30Ud are each formed of two layers of superalloy, but the side wall 30Uc is formed of a single layer of superalloy and has a thin thickness and, likewise, only the side wall 30Lc of the second coupling member 30L is formed of a single layer of superalloy and has a thin thickness, and that the length W1 from the upper end to the lower end of the first opening area 13a in the axial direction of the fuel elements 2 is equal to the length W2 from the upper end to the lower end of the second opening area 13b in the axial direction of the fuel elements 2.

The remaining structure is basically similar to that of the first embodiment, including that the distance S1 from the upper end of the first coupling member 30U to the upper end of the second coupling member 30L in the axial direction of the fuel elements 2 is equal to the distance L1 from the upper end of the first opening area 13a to the upper end of the second opening area 13b in the axial direction of the fuel elements 2, and hence that the distance L2 from the lower end of the first opening area 13a to the lower end of the second opening area 13b in the axial direction of the fuel elements 2 is smaller than the distance S2 from the lower end of the first coupling member 30U to the lower end of the second coupling member 30L in the axial direction of the fuel elements 2.

A description will be made, with reference to FIG. 19, of that L2<S2 is held as a result of S1=L1, H1<H2 and W1=W2.

Figure 19:
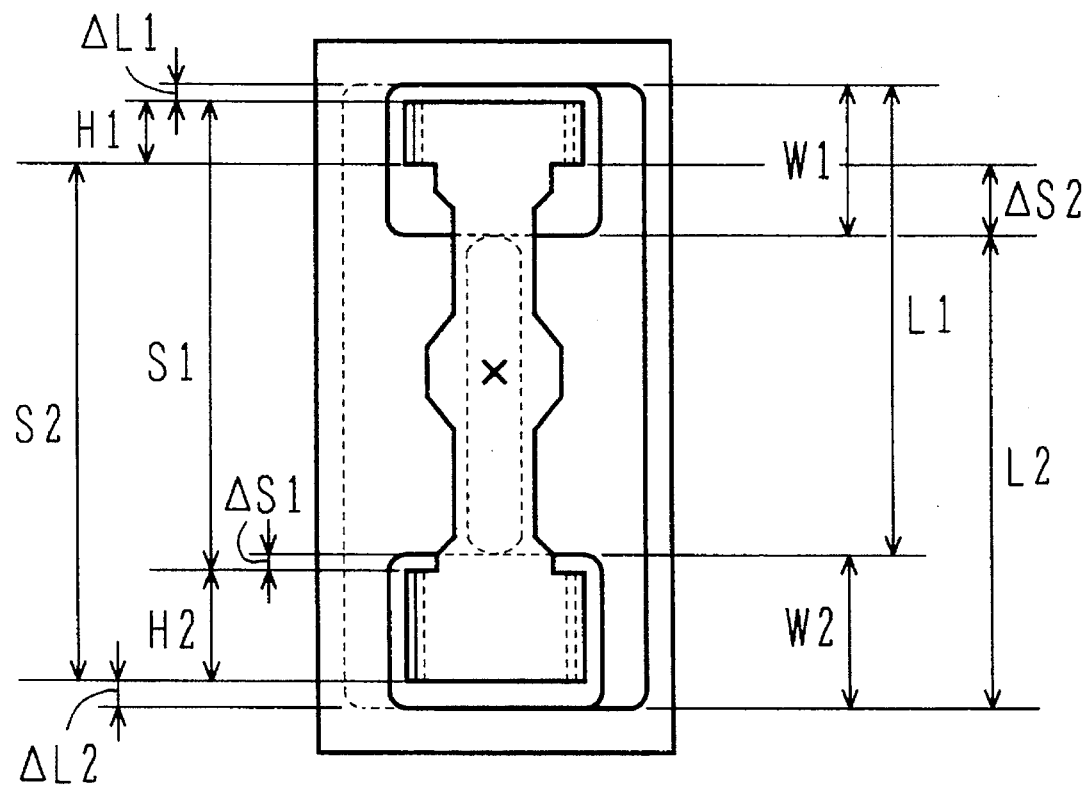
FIG. 19 is a view for explaining that L2<S2 holds on condition of S1=L1, H1<H2 and W1=W2.

In FIG. 19, excluding the overlapped portion between L2 and S2, the condition of L2<S2 is equally represented by L2<S2. This means that if L2<S2 is proved, L2 S2 is also proved.

Given S1=L1, this relationship is equally represented S1=L1, excluding the overlapped portion between S1 and L1.

Now, from the relationship of H1<H2, S2>L2 is held. Thus, L2<S2 is satisfied.

In the above arrangements, W1=W2 and H1<H2 are held unlike the first embodiment, but L2<S2 is held as with the first embodiment. Also in this third embodiment, therefore, when the fuel element 2 is inserted, the lower end of the second coupling member 30L comes into contact with the lower end of the second opening area 13b, but the lower end of the first coupling member 30U does not come into contact with the lower end of the first opening area 13a. Accordingly, the effect of improving the assembly efficiency can be achieved as with the first embodiment. The other advantages can also be achieved likewise.

If the arrangements are modified to meet W1=W2, H1>H2 and L2>S2 as opposed to the foregoing concept of this embodiment, when the fuel element 2 is inserted, the lower end of the first coupling member 30U comes into contact with the lower end of the first opening area 13a, but the lower end of the second coupling member 30L does not come into contact with the lower end of the second opening area 13b as with the second embodiment. Accordingly, the similar effect of improving the assembly efficiency as in the second embodiment can be achieved.

Further, in the above third embodiment, since the side wall 30Uc of the first coupling member 30U is formed of a single layer and has a thin thickness and the side wall 30Lc of the second coupling member 30L is also formed of a single layer and has a thin thickness, rotating forces are produced because of a difference in thickness between one side wall and other three side walls. As explained above in connection with the first embodiment, however, the direction in which the rotating forces are generated is the same as the direction in which the leaf spring portions 12 are exerting their resilient forces, and reaction forces are produced by the friction forces between the leaf spring portions 12 and the fuel elements 2 to cancel the rotating forces. Eventually, the wall thickness and the number of wall layers in the pressing direction of the leaf spring portions are not important.

In the above first to third embodiments, the conditions specified with regard to W1 and W2, for example, W1=W2, W1>W2 and W1<W2. As will be apparent from FIG. 1 and so on, however, those relationships between W1 and W2 can directly be replaced by the relationships between L1 and L2. In other words, the above three conditions of W1=W2, W1>W2 and W1<W2 are identical respectively to L1=L2, L1>L2 and L1<L2, and have the similar meanings.

In addition to the configurations shown in the above first to third embodiments, the round cell may have any other suitable configuration. By way of example, the present invention is also applicable to a round cell having a projection 8C as shown in FIG. 10 of the above-cited JP, B, 3-78679, and the similar advantages can be achieved in such a case as well.

A fourth embodiment of the present invention will be described with reference to FIG. 20. This embodiment concerns a fuel assembly 1 using the fuel spacer 7 of the above first embodiment.

Figure 20:
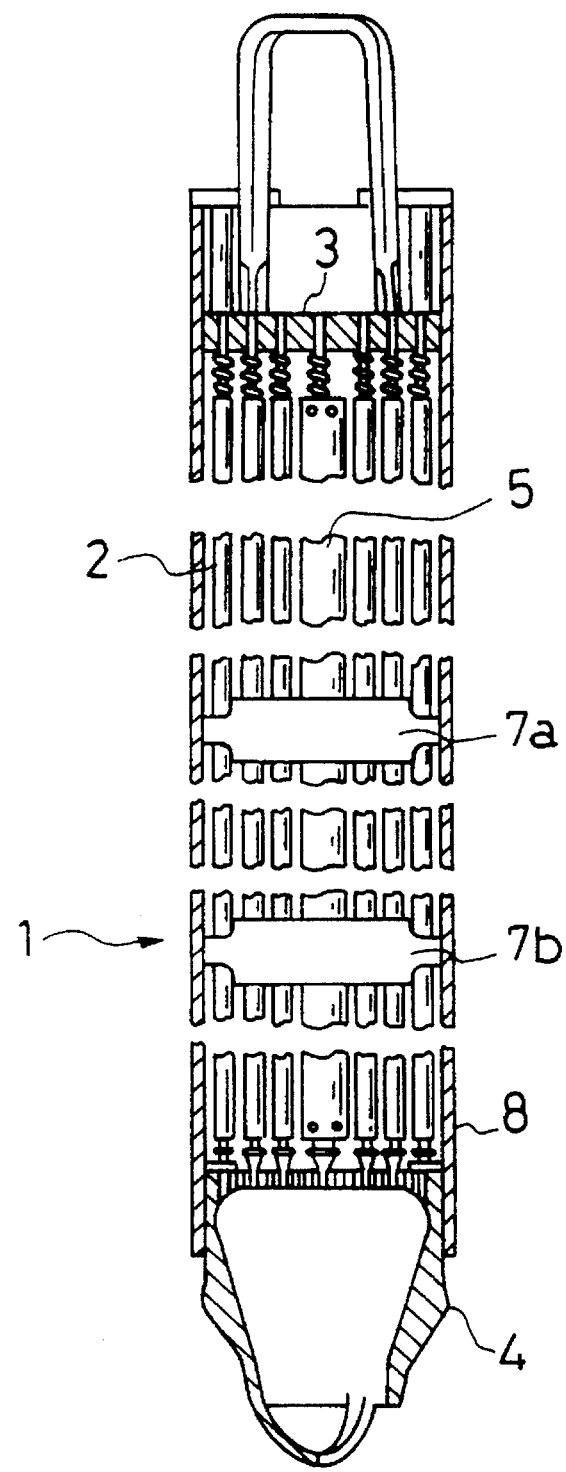
FIG. 20 is a vertical sectional view showing the structure of a fuel assembly according to a fourth embodiment of the present invention.

FIG. 20 shows the structure of the fuel assembly of this embodiment.

In FIG. 20, the fuel assembly 1 comprises 60 rods of fuel elements 2, one water rod 5, a plurality of fuel spacers 7a, 7b . . . for holding the fuel elements 2 and the water rod 5 while keeping certain spacings therebetween, an upper tie plate 3 and a lower tie plate 4 for supporting a bundle of the fuel elements 2 and the water rod 5 at its upper and lower portions, and a channel box 8 surrounding the bundle. The fuel spacers 7a, 7b . . . are disposed in plural number with intervals in the axial direction of the fuel elements (i.e., in the vertical direction) 2, and are each formed of the fuel spacer 7 described in connection with the first embodiment.

The fuel assembly of this embodiment can also provide the similar advantages as in the first embodiment.

While, in this fourth embodiment, all the fuel spacers 7a, 7b . . . of the fuel assembly 1 are each formed of the fuel spacer 7 of the first embodiment, the present invention is not limited the illustrated embodiment. The fuel spacer 7 of the first embodiment may be applied to only part of the fuel spacers used for the fuel assembly 1, for example, such that it is applied to only first and second fuel spacers of the fuel assembly 1 counting from above. This modification can also provide the similar advantages.

Additionally, while, in this fourth embodiment, the fuel spacers 7a, 7b . . . are formed of the fuel spacers 7 of the first embodiment, the present invention is not limited the illustrated embodiment, and they may be formed of the fuel spacers 7 of the second or third embodiment. This modification can also provide the similar advantages as obtained by the fuel spacer 7 of the second or third embodiment.

What is claimed is:

1. A fuel spacer comprising a plurality of cylindrical members to which fuel elements are respectively inserted, and a plurality of loop-like spring members held by said cylindrical members for resiliently supporting the fuel elements positioned in the respective pairs of adjacent cylindrical members, said plurality of cylindrical members each including a spring support portion inserted to said loop-like spring member for supporting said loop-like spring member and first and second opening areas formed respectively above and below said spring support portion, said plurality of loop-like spring members each comprising a pair of leaf spring portions and first and second coupling portions for coupling said pair of leaf spring portions at two upper and lower points, wherein:

the distance from the upper end of said first opening area to the upper end of said second opening area in the axial direction of said fuel elements is substantially equal to the distance from the upper end of said first coupling portion to the upper end of said second coupling portion in the axial direction of said fuel elements, and the distance from the lower end of said first opening area to the lower end of said second opening area in the axial direction of said fuel elements has a different value from the distance from the lower end of said first coupling portion to the lower end of said second coupling portion in the axial direction of said fuel elements.

2. A fuel spacer according to claim 1, wherein the difference between said distance from the upper end of said first opening area to the upper end of said second opening area in the axial direction of said fuel elements and said distance from the upper end of said first coupling portion to the upper end of said second coupling portion in the axial direction of said fuel elements is not larger than 2 % of the total axial length of said loop-like spring member.

3. A fuel spacer according to claim 1, wherein the distance from the lower end of said first opening area to the lower end of said second opening area in the axial direction of said fuel elements is smaller than the distance from the lower end of said first coupling portion to the lower end of said second coupling portion in the axial direction of said fuel elements.

4. A fuel spacer according to claim 1, wherein the distance from the lower end of said first opening area to the lower end of said second opening area in the axial direction of said fuel elements is larger than the distance from the lower end of said first coupling portion to the lower end of said second coupling portion in the axial direction of said fuel elements.

5. A fuel spacer according to claim 3 or 4, wherein the difference between said distance from the lower end of said first opening area to the lower end of said second opening area in the axial direction of said fuel elements and said distance from the lower end of said first coupling portion to the lower end of said second coupling portion in the axial direction of said fuel elements is larger than 2% of the total axial length of said loop-like spring member.

6. A fuel spacer according to claim 3, wherein the length from the upper end to the lower end of said first coupling portion in the axial direction of said fuel elements is equal to the length from the upper end to the lower end of said second coupling portion in the axial direction of said fuel elements, and the length from the upper end to the lower end of said first opening area in the axial direction of said fuel elements is larger than the length from the upper end to the lower end of said second opening area in the axial direction of said fuel elements.

7. A fuel spacer according to claim 4, wherein the length from the upper end to the lower end of said first coupling portion in the axial direction of said fuel elements is equal to the length from the upper end to the lower end of said second coupling portion in the axial direction of said fuel elements, and the length from the upper end to the lower end of said first opening area in the axial direction of said fuel elements is smaller than the length from the upper end to the lower end of said second opening area in the axial direction of said fuel elements.

8. A fuel spacer according to claim 3, wherein the length from the upper end to the lower end of said first opening area in the axial direction of said fuel elements is equal to the length from the upper end to the lower end of said second opening area in the axial direction of said fuel elements, and the length from the upper end to the lower end of said first coupling portion in the axial direction of said fuel elements is smaller than the length from the upper end to the lower end of said second coupling portion in the axial direction of said fuel elements.

9. A fuel spacer according to claim 4, wherein the length from the upper end to the lower end of said first opening area in the axial direction of said fuel elements is equal to the length from the upper end to the lower end of said second opening area in the axial direction of said fuel elements, and the length from the upper end to the lower end of said first coupling portion in the axial direction of said fuel elements is larger than the length from the upper end to the lower end of said second coupling portion in the axial direction of said fuel elements.

10. A fuel spacer according to claim 3, wherein the length from the upper end to the lower end of said first coupling portion in the axial direction of said fuel elements is equal to the length from the upper end to the lower end of said second coupling portion in the axial direction of said fuel elements, and the length from the upper end of said first opening area to the upper end of said second opening area in the axial direction of said fuel elements is larger than the length from the lower end of said first opening area to the lower end of said second opening area in the axial direction of said fuel elements.

11. A fuel spacer according to claim 4, wherein the length from the upper end to the lower end of said first coupling portion in the axial direction of said fuel elements is equal to the length from the upper end to the lower end of said second coupling portion in the axial direction of said fuel elements, and the length from the upper end of said first opening area to the upper end of said second opening area in the axial direction of said fuel elements is smaller than the length from the lower end of said first opening area to the lower end of said second opening area in the axial direction of said fuel elements.

12. A fuel spacer according to claim 3, wherein the length from the upper end of said first opening area to the upper end of said second opening area in the axial direction of said fuel elements is equal to the length from the lower end of said first opening area to the lower end of said second opening area in the axial direction of said fuel elements, and the length from the upper end to the lower end of said first coupling portion in the axial direction of said fuel elements is smaller than the length from the upper end to the lower end of said second coupling portion in the axial direction of said fuel elements.

13. A fuel spacer according to claim 4, wherein the length from the upper end of said first opening area to the upper end of said second opening area in the axial direction of said fuel elements is equal to the length from the lower end of said first opening area to the lower end of said second opening area in the axial direction of said fuel elements, and the length from the upper end to the lower end of said first coupling portion in the axial direction of said fuel elements is larger than the length from the upper end to the lower end of said second coupling portion in the axial direction of said fuel elements.

14. A fuel spacer according to claim 1, wherein said first and second coupling portions are each a member in a substantially rectangular tubular shape defining therein a coolant pathway extending in the axial direction of said fuel elements and, of four side walls making up said substantially rectangular tubular shape, two opposed side walls extending substantially parallel to the direction in which said pair of leaf spring portions are exerting pressing forces have the same thickness.

15. A fuel spacer according to claim 1, wherein said first and second coupling portions each define therein a coolant pathway for introducing a coolant in the axial direction of said fuel elements.

16. A fuel assembly comprising a plurality of fuel elements and at least one water rod, and the fuel spacers according to claim 1 for holding said fuel elements and said water rod while keeping certain spacings therebetween.

17. A fuel assembly comprising a plurality of fuel elements and at least one water rod, and fuel spacers for holding said fuel elements and said water rod while keeping certain spacings therebetween, said fuel spacers each including a plurality of cylindrical members to which fuel elements are respectively inserted, and a plurality of loop-like spring members held by said cylindrical members for resiliently supporting said fuel elements, said plurality of cylindrical members each comprising a spring support portion inserted to said loop-like spring member for supporting said loop-like spring member and first and second opening areas formed respectively above and below said spring support portion, said plurality of loop-like spring members each comprising a pair of leaf spring portions and first and second coupling portions for coupling said pair of leaf spring portions at two upper and lower points, wherein:

the distance from the upper end of said first opening area to the upper end of said second opening area in the axial direction of said fuel elements is substantially equal to the distance from the upper end of said first coupling portion to the upper end of said second coupling portion in the axial direction of said fuel elements, and the distance from the lower end of said first opening area to the lower end of said second opening area in the axial direction of said fuel elements has a different value from the distance from the lower end of said first coupling portion to the lower end of said second coupling portion in the axial direction of said fuel elements.

18. A fuel assembly according to claim 17, wherein the distance from the lower end of said first opening area of said fuel spacer to the lower end of said second opening area thereof in the axial direction of said fuel elements is smaller than the distance from the lower end of said first coupling portion to the lower end of said second coupling portion in the axial direction of said fuel elements.

19. A fuel assembly according to claim 17, wherein the length from the upper end to the lower end of said first coupling portion of said fuel spacer in the axial direction of said fuel elements is equal to the length from the upper end to the lower end of said second coupling portion thereof in the axial direction of said fuel elements, and the length from the upper end to the lower end of said first opening area in the axial direction of said fuel elements is larger than the length from the upper end to the lower end of said second opening area in the axial direction of said fuel elements.

20. A fuel assembly according to claim 17, wherein said first and second coupling portions of said fuel spacer are each a member in a substantially rectangular tubular shape defining therein a coolant pathway extending in the axial direction of said fuel elements and, of four side walls making up said substantially rectangular tubular shape, two opposed side walls extending substantially parallel to the direction in which said pair of leaf spring portions are exerting pressing forces have the same thickness.

21. A fuel assembly according to claim 17, wherein said first and second coupling portions of said fuel spacer each define therein a coolant pathway for introducing a coolant in the axial direction of said fuel elements.

22. A fuel spacer comprising a plurality of cylindrical members to which fuel elements are respectively inserted, and a plurality of loop-like spring members held by said cylindrical members for resiliently supporting the fuel elements positioned in the respective pairs of adjacent cylindrical members, said plurality of cylindrical members each including a spring support portion having at least one spring support means inserted to said loop-like spring member for supporting said loop-like spring member, a first opening area formed above said spring support portion, and a second opening area formed below the said spring support portion, said plurality of loop-like spring members each comprising a pair of leaf spring portions, a first coupling portion for coupling said pair of leaf spring portions at an upper point, and a second coupling portion for coupling said pair of leaf spring portions at a lower point, said first coupling portion being inserted in said first opening area and second coupling portion being inserted in said second opening area, wherein:

the upper end of said first opening area has a first upper portion opposite to the upper end of said first coupling portion in the axial direction of said fuel element, the upper end of said second opening area has a second upper portion opposite to the upper end of said second coupling portion in said axial direction, the distance from said first upper portion to said second upper portion in said axial direction is substantially equal to the distance from the upper end of said first coupling portion to the upper end of said second coupling portion in said axial direction, and the lower end of said first opening area has a first lower portion opposite to the lower end of said first coupling portion in said axial direction, the lower end of said second opening area has a second lower portion opposite to the lower end of said second coupling portion in said axial direction, the distance from said first lower portion to said second lower portion in said axial direction has a different value from the distance from the lower end of said first coupling portion to the lower end of said second coupling portion in said axial direction.

23. A fuel assembly comprising at least one fuel spacer according to claim 22, wherein said fuel assembly includes a plurality of fuel elements and at least one water rod, said at least one fuel spacer for holding said fuel elements and said water rod while keeping certain spacings therebetween.

* * * * *